(12) United States Patent
Fukuhara et al.

(10) Patent No.: US 8,411,984 B2
(45) Date of Patent: Apr. 2, 2013

(54) IMAGE PROCESSING DEVICE AND METHOD

(75) Inventors: Takahiro Fukuhara, Kanagawa (JP); Naoto Nishimura, Kanagawa (JP); Hiroshi Akinaga, Kanagawa (JP)

(73) Assignee: Sony Corporation (JP)

( * ) Notice: Subject to any disclaimer, the term of this patent is extended or adjusted under 35 U.S.C. 154(b) by 219 days.

(21) Appl. No.: 12/930,930

(22) Filed: Jan. 20, 2011

(65) Prior Publication Data

US 2011/0188765 A1 Aug. 4, 2011

(30) Foreign Application Priority Data

Jan. 29, 2010 (JP) ................. P2010-018284

(51) Int. Cl.
*G06K 9/40* (2006.01)
(52) U.S. Cl. .......... 382/260; 382/240; 382/248
(58) Field of Classification Search .......... 382/232, 382/233, 240, 248, 260; 348/14.12; 375/240.19, 375/240.28; 424/139.1; 435/5, 6.14, 634, 435/560; 702/19; 704/219, 500
See application file for complete search history.

(56) References Cited

U.S. PATENT DOCUMENTS 6,608,630 B1 * 8/2003 MacInnis et al. ............. 345/634
6,975,689 B1 * 12/2005 McDonald et al. ........... 375/316

FOREIGN PATENT DOCUMENTS

| JP | 408051553 | * | 2/1996 |
| JP | 409284608 | * | 10/1997 |
| JP | 2006-311327 A | | 11/2006 |

* cited by examiner

*Primary Examiner* — Anh Hong Do
(74) *Attorney, Agent, or Firm* — Lerner, David, Littenberg, Krumholz & Mentlik, LLP

(57) ABSTRACT

An image processing device includes a supply unit that supplies a coefficient data group in each sub-band, in which image data of a predetermined number of lines is decomposed for each frequency band by a hierarchical analysis filter process and which includes coefficient data of one line or more in a sub-band of at least a lowest frequency component, a synthesis filter unit that synthesizes the coefficient data group and generates image data in a baseband, a supply control unit that controls the supply unit to supply the coefficient data at such a timing that the synthesis filter unit can generate the image data at a timing corresponding to a horizontal synchronization period, and a synthesis filtering control unit that controls the synthesis filter unit to synthesize the coefficient data group in the predetermined order and generate the image data at a timing corresponding to the horizontal synchronization period.

10 Claims, 20 Drawing Sheets

FIG. 14

| | HORIZONTAL SIZE (TOTAL) | VALID HORIZONTAL SIZE | H BLANK |
|---|---|---|---|
| 1,920 × 1,080@60i | 2,200 | 1,920 | 280 |
| 1,280 × 720@24p | 4,125 | 1,280 | 2,845 |

IMAGE PROCESSING DEVICE AND METHOD

CROSS-REFERENCE TO RELATED APPLICATION

The present application claims priority from Japanese Patent Application No. JP 2010-018284 filed in the Japanese Patent Office on Jan. 29, 2010, the entire content of which is incorporated herein by reference.

BACKGROUND OF THE INVENTION

1. Field of the Invention

The present invention relates to an image processing device and an image processing method, and more particularly to an image processing device and an image processing method capable of realizing a lower delay decoding process.

2. Description of the Related Art

As representative image compression methods in the related art, there are JPEG (Joint Photographic Experts Group) and JPEG2000 which are standardized by the ISO (International Standards Organization).

Recently, there have been wide studies on methods where images are divided into a plurality of bands using a filter called a filter bank constituted by a high pass filter and a low pass filter, and encoding is performed for each band. Among them, wavelet transform encoding has attracted attention as a new technique replacing a DCT (Discrete Cosine Transform) since there is no block distortion in high compression which is problematic in the DCT.

JPEG2000, which was standardized internationally in January 2001, employs a scheme where entropy encoding (bit modeling with bit plane units and arithmetic coding) with high efficiency is combined into the wavelet transform, and considerably improves encoding efficiency as compared with JPEG.

JPEG2000 has been selected as a standard codec for a digital cinema specification (DCI (digital cinema initiative) specification) and has begun to be used for compression of moving images such as movies. Also, each manufacturer has begun to manufacture products where JPEG2000 is applied to monitoring cameras, interview cameras for broadcasting stations, security recorders or the like.

De facto codecs using the wavelet transform in addition to JPEG2000 have been developed and released from each facility.

The use of these codecs in instant (real-time) data transmission is being taken into consideration. Encoding of image data, data transmission of the encoded data, and decoding of the transmitted encoded data are performed together, and thus low delay data transmission such as, for example, so-called live broadcasting is realized.

However, since JPEG2000 fundamentally performs encoding and decoding with picture units, if low delay is intended to be realized so as to be used for real-time transmission and reception, at least an amount of one picture is delayed in the encoding, and at least an amount of one picture is also delayed in the decoding.

This is true of not only JPEG2000, but also any codec such as an AVC (Advanced Video Coding) intra, JPEG, or the like. However, recently, a means has been proposed which divides an image plane into several rectangular slices or tiles, and performs encoding and decoding for each of them independently, thereby reducing delay time (for example, refer to Japanese Unexamined Patent Application Publication No. 2006-311327).

When the above-described low delay data transmission is realized using such a codec, it is necessary for a decoder to output a predetermined amount of decoded video signals, for example, within an H blank (horizontal blank) or a V blank (vertical blank), which is one of the characteristics of the video signal.

SUMMARY OF THE INVENTION

However, in order to perform an inverse wavelet transform process in a lower delay manner, it is necessary to perform a synthesis filtering for each piece of coefficient data in a complex order, and thus deviation is generated at the timings of line outputs.

In other words, the amount of necessary synthesis filtering processes is different in each line output due to the line outputs.

For this reason, if the coefficient data undergoes the inverse wavelet transform in a haphazard fashion, there is a concern that the decoded image display will be broken since the line outputs are overly fast or overly slow with respect to the requested rate.

It is desirable to realize a lower delay decoding process independently from a video format, by controlling line output timings corresponding with the characteristics of the video format.

According to an embodiment of the present invention, there is a provided an image processing device including a supply means that supplies a coefficient data group in each sub-band, in which image data of a predetermined number of lines is decomposed for each frequency band by a hierarchical analysis filter process and which includes coefficient data of one line or more in a sub-band of at least a lowest frequency component; a synthesis filter means that synthesizes the coefficient data group supplied by the supply means in a predetermined order and generates image data in a baseband; a supply control means that controls the supply means to supply the coefficient data at such a timing that the synthesis filter means can generate the image data in the baseband at a timing corresponding to a horizontal synchronization period indicating a period between horizontal synchronization signals of the image data; and a synthesis filtering control means that controls the synthesis filter means to synthesize the coefficient data group supplied by the supply means in the predetermined order and generate the image data in the baseband at a timing corresponding to the horizontal synchronization period.

The synthesis filter means may synthesize the coefficient data group in an order to more preferentially generate a higher frequency component, and the supply control means may control the supply means to supply the coefficient data necessary for the synthesis at such a timing that the synthesis filter means can synthesize in the order and generate the image data in the baseband by two lines every other horizontal synchronization period.

The image processing device may further include a determination means that determines a length of the horizontal synchronization period of the image data, wherein the supply control means may control the supply means to supply the coefficient data at such a timing that the synthesis filter means can generate the image data in the baseband at a timing corresponding to the horizontal synchronization period determined by the determination means, and wherein the synthesis filtering control means may control the synthesis filter means to generate the image data in the baseband at a timing corresponding to the horizontal synchronization period determined by the determination means.

The determination means may determine a length of a horizontal blank interval of the image data, and the image processing device may further include a supply start timing control means that controls a timing when the supply means starts supplying the coefficient data to the synthesis filter means according to the length of the horizontal blank interval determined by the determination means.

The image processing device may further include a storage means that stores the coefficient data group supplied to the synthesis filter means, wherein the supply means may read the coefficient data stored in the storage means and supplies the read coefficient data to the synthesis filter means, and wherein the supply control means may control the supply means to read the coefficient data from the storage means.

The image processing device may further include a calculation means that calculates a data amount of the coefficient data stored in the storage means; a determination means that determines whether or not the data amount calculated by the calculation means exceeds a predetermined threshold value set in advance; and an adjustment means that makes the supply means promptly read the coefficient data stored in the storage means when the determination means determines that the data amount exceeds the threshold value.

The image processing device may further include a calculation means that calculates a data amount of the coefficient data stored in the storage means; a determination means that determines whether or not the data amount calculated by the calculation means is smaller than a predetermined threshold value set in advance; and an adjustment means that prevents the supply means from reading the coefficient data stored in the storage means when the determination means determines that the data amount is smaller than the threshold value.

The image processing device may further include a horizontal blank interval determination means that determines a length of a horizontal blank interval of the image data; a calculation means that calculates a data amount of the coefficient data stored in the storage means; a data amount determination means that determines whether or not the data amount calculated by the calculation means exceeds a predetermined first threshold value set in advance when the horizontal blank interval determination means determines that the horizontal blank interval is long, and that determines whether or not the data amount calculated by the calculation means exceeds a predetermined second threshold value set in advance which is smaller than the first threshold value, when the horizontal blank interval determination means determines that the horizontal blank interval is short; an adjustment means that makes the supply means promptly read the coefficient data stored in the storage means when the data amount determination means determines that the data amount exceeds the first threshold value, and that prevents the supply means from reading the coefficient data stored in the storage means when the data amount determination means determines that the data amount is smaller than the second threshold value.

According to an embodiment of the present invention, there is provided an image processing method in an image processing device, including the steps of causing a supply means of the image processing device to supply a coefficient data group in each sub-band, in which image data of a predetermined number of lines is decomposed for each frequency band by a hierarchical analysis filter process and which includes coefficient data of one line or more in a sub-band of at least a lowest frequency component; causing a synthesis filter means of the image processing device to synthesize the coefficient data group supplied by the supply means in a predetermined order and generate image data in a baseband; causing a supply control means of the image processing device to control the supply means to supply the coefficient data at such a timing that the synthesis filter means can generate the image data in the baseband at a timing corresponding to a horizontal synchronization period indicating a period between horizontal synchronization signals of the image data; and causing a synthesis filtering control means of the image processing device to control the synthesis filter means to synthesize the coefficient data group supplied by the supply means in the predetermined order and generate the image data in the baseband at a timing corresponding to the horizontal synchronization period.

According to an embodiment of the present invention, a coefficient data group in each sub-band is supplied, in which image data of a predetermined number of lines is decomposed for each frequency band by a hierarchical analysis filter process and which includes coefficient data of one line or more in a sub-band of at least a lowest frequency component, the supplied coefficient data group is synthesized in a predetermined order to thereby generate image data in a baseband, the coefficient data is supplied at such a timing that the image data in the baseband can be generated at a timing corresponding to a horizontal synchronization period indicating a period between horizontal synchronization signals of the image data, and the supplied coefficient data group is synthesized in the predetermined order and the image data in the baseband is generated at a timing corresponding to the horizontal synchronization period.

According to the present invention, it is possible to process images. Particularly, it is possible to realize a lower delay decoding process.

BRIEF DESCRIPTION OF THE DRAWINGS

FIG. 14 is a diagram illustrating an example of a video format.

DESCRIPTION OF THE PREFERRED EMBODIMENTS

Hereinafter, embodiments of the present invention will be described. The description will be made in the following order. 1. First embodiment (decoding device) 2. Second embodiment (personal computer)
1. First Embodiment
Description of Encoding Process The present invention relates to a decoding process of encoded data obtained by encoding image data; however, first, an encoding process of the image data corresponding to the decoding process will be described.

Figure 1:
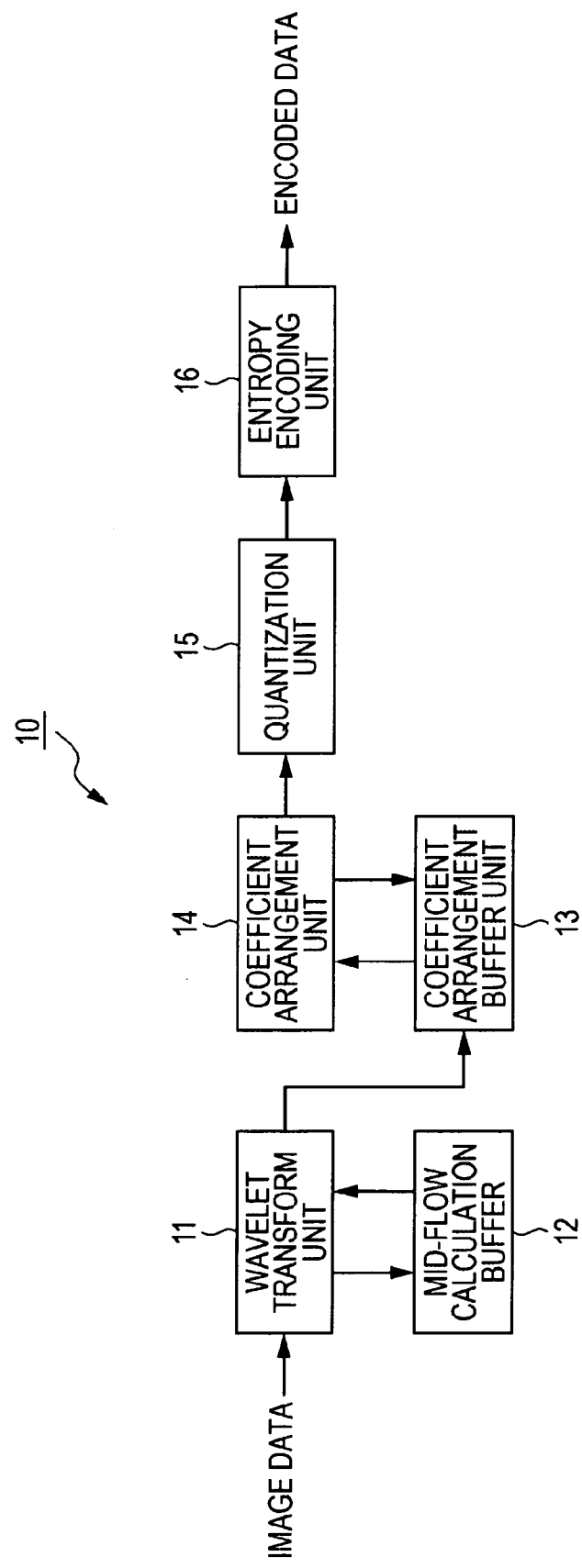
FIG. 1 is a block diagram illustrating an example of a main configuration of an encoding device.

FIG. 1 is a diagram illustrating a configuration example of an encoding device which encodes image data.

An encoding device 10 shown in FIG. 1 generates and outputs encoded data by encoding input image data. As shown in FIG. 1, the encoding device 10 includes a wavelet transform unit 11, a mid-flow calculation buffer 12, a coefficient arrangement buffer unit 13, a coefficient arrangement unit 14, a quantization unit 15, and an entropy encoding unit 16.

Image data input to the encoding device 10 is temporarily stored in the mid-flow calculation buffer 12 via the wavelet transform unit 11.

The wavelet transform unit 11 performs a wavelet transform for the image data stored in the mid-flow calculation buffer 12. Details of the wavelet transform will be described later. The wavelet transform unit 11 supplies coefficient data obtained by the wavelet transform to the coefficient arrangement buffer unit 13.

The coefficient arrangement unit 14 reads the coefficient data written in the coefficient arrangement buffer unit 13 in a predetermined order (for example, an order of an inverse wavelet transform process) and supplies the read coefficient data to the quantization unit 15.

The quantization unit 15 quantizes the supplied coefficient data by a predetermined method, and supplied obtained coefficient data (quantized coefficient data) to the entropy encoding unit 16.

The entropy encoding unit 16 encodes the supplied coefficient data by, for example, a predetermined entropy encoding method called a Huffman coding or an arithmetic coding. The entropy encoding unit 16 outputs the generated encoding data to the outside of the encoding device 10.
Sub-Band Next, the wavelet transform will be described. The wavelet transform is a process which transforms image data into coefficient data for each frequency component constituted by hierarchy, by recursively repeating an analysis filtering, which divides the image data into a high component of spatial frequency (high frequency component) and a low component thereof (low frequency component), for the generated low frequency component. Also, hereinafter, a division level is referred to as a low rank for a hierarchy of the high frequency component and a high rank for a hierarchy of the low frequency component.

For one hierarchy (division level), the analysis filtering is performed in both of a horizontal direction and a vertical direction. Thereby, coefficient data (image data) for one hierarchy is divided into four kinds of components by the analysis filtering for the one hierarchy. The four kinds of components include components HH which have high frequency in both of the horizontal direction and the vertical direction, components HL which have high frequency in the horizontal direction and low frequency in the vertical direction, components LH which have low frequency in the horizontal direction and high frequency in the vertical direction, and components LL which have low frequency in both of the horizontal direction and the vertical direction. Sets of the respective components are referred to as sub-bands.

In a state where the analysis filtering is performed for a certain hierarchy to thereby generate four sub-bands, the analysis filtering for a next (higher rank by one) hierarchy is performed for the components LL which have low frequency in both of the horizontal direction and the vertical direction, among the generated four sub-bands.

By recursively repeating the analysis filtering in this way, coefficient data in the low frequency of the spatial frequency is concentrated in a smaller region (low frequency component). Therefore, by encoding the wavelet-transformed coefficient data, it is possible to perform an efficient encoding.

Figure 2:
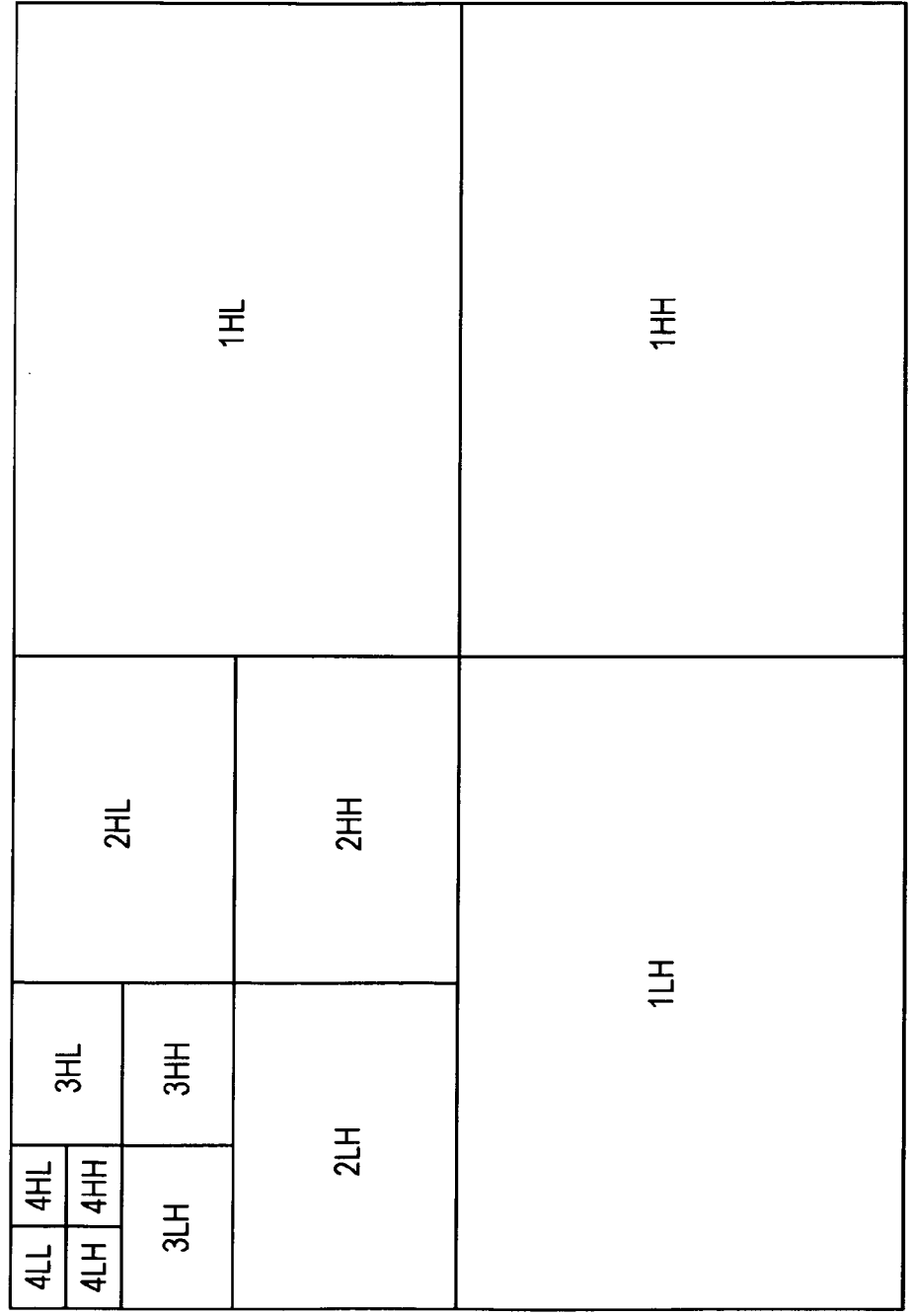
FIG. 2 is a diagram illustrating a sub-band.
Figure 3:
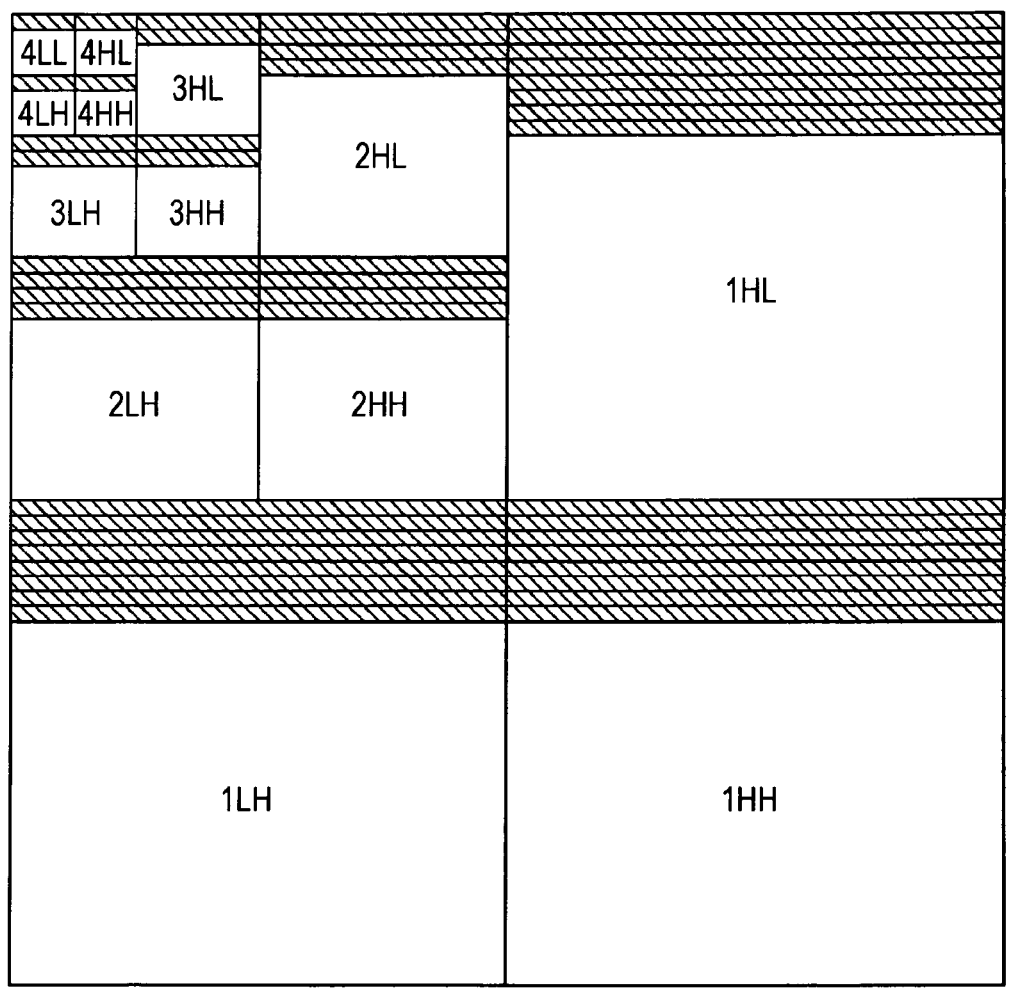
FIG. 3 is a diagram illustrating a line block.

FIG. 2 shows a configuration of coefficient data which is divided into thirteen sub-bands 1LH,1HL,1HH,2LH,2HL, 2HH,3LH,3HL,3HH,4LL,4LH,4HL,4HH up to a division level 4, by four repetitions of the analysis filtering.
Line Block Next, a line block will be described. FIG. 3 is a diagram illustrating a line block. The analysis filtering in the wavelet transform generates coefficient data of one line in four sub-bands on one hierarchy from image data or coefficient data of two lines to be processed.

Therefore, for example, when the division level number is 4, as marked with diagonal parts in FIG. 3, in order to obtain coefficient data of one line in each sub-band of the division level 4 which is a highest rank hierarchy, coefficient data of two lines in the sub-band 3LL is necessary.

In order to obtain the sub-band 3LL of two lines, that is, coefficient data of two lines in each sub-band of the division level 3, coefficient data of four lines in the sub-band 2LL is necessary.

In order to obtain the sub-band 2LL of four lines, that is, coefficient data of four lines in each sub-band of the division level 2, coefficient data of eight lines in the sub-band 1LL is necessary.

In order to obtain the sub-band 1LL of eight lines, that is, coefficient data of eight lines in each sub-band of the division level 1, coefficient data of sixteen lines in the baseband is necessary.

In other words, in order to obtain coefficient data of one line in each sub-band of the division level 4, image data of sixteen lines in the baseband is necessary.

The image data of the number of lines necessary for generation of the coefficient data of one line in the sub-band of the lowest frequency components (in the case of the example shown in FIG. 3, 4LL) is referred to as a line block (or a precinct).

For example, when a division level number is N, in order to generate coefficient data of one line in a sub-band of lowest frequency components, image data of N squared of 2 lines in a baseband is necessary. This is the number of lines of the line block.

In addition, the line block also indicates a set of coefficient data in each sub-band obtained by performing the wavelet transform for image data of one line block.

The line indicates a pixel group of one line in a frame image (picture) in the horizontal direction or a coefficient group of one line in a sub-band in the horizontal direction. The coefficient data of one line is referred to as a coefficient line. Also, the image data of the one line is referred to as an image line. Hereinafter, in a case where it is necessary to make descriptions through a more detailed differentiation, the expressions thereof may be appropriately altered.

Further, encoded data of one line obtained by encoding the one coefficient line (the coefficient data of one line) is referred to as an encoded line.

The wavelet transform unit 11 performs the analysis filtering for image data (or coefficient data) of two lines; however, at this time, the wavelet transform unit 11 selects the two lines in an order for performing the process in as low a delay manner as possible.

More specifically, the wavelet transform unit 11 selects image data or coefficient data of two lines in an order for preferentially generating coefficient data in a higher rank (lower frequency) sub-band as possible and performs the analysis filtering for the selected image data or coefficient data.

5×3 Analysis Filter

Next, the analysis filtering will be described.

The wavelet transform process is typically performed using a filter bank constituted by a low pass filter and a high pass filter.

As a detailed example of the wavelet transform process, a method of using a 5×3 filter will be described.

An impulse response (Z transform expression) of the 5×3 filter includes the low pass filter $H0(z)$ and the high pass filter $H1(z)$ as shown in the following equations (1) and (2). It can be seen from the equations (1) and (2) that the low pass filter $H0(z)$ has five taps and the high pass filter $H1(z)$ has three taps.

$$H0(z)=(-1+2z-1+6z-2+2z-3-z-4)/8 \quad (1)$$

$$H1(z)=(-1+2z-1-z-2)/2 \quad (2)$$

By the equations (1) and (2), low frequency component and high frequency component coefficients can be directly calculated. Here, calculation in the filter process can be reduced by using a lifting technique.

Figure 4:
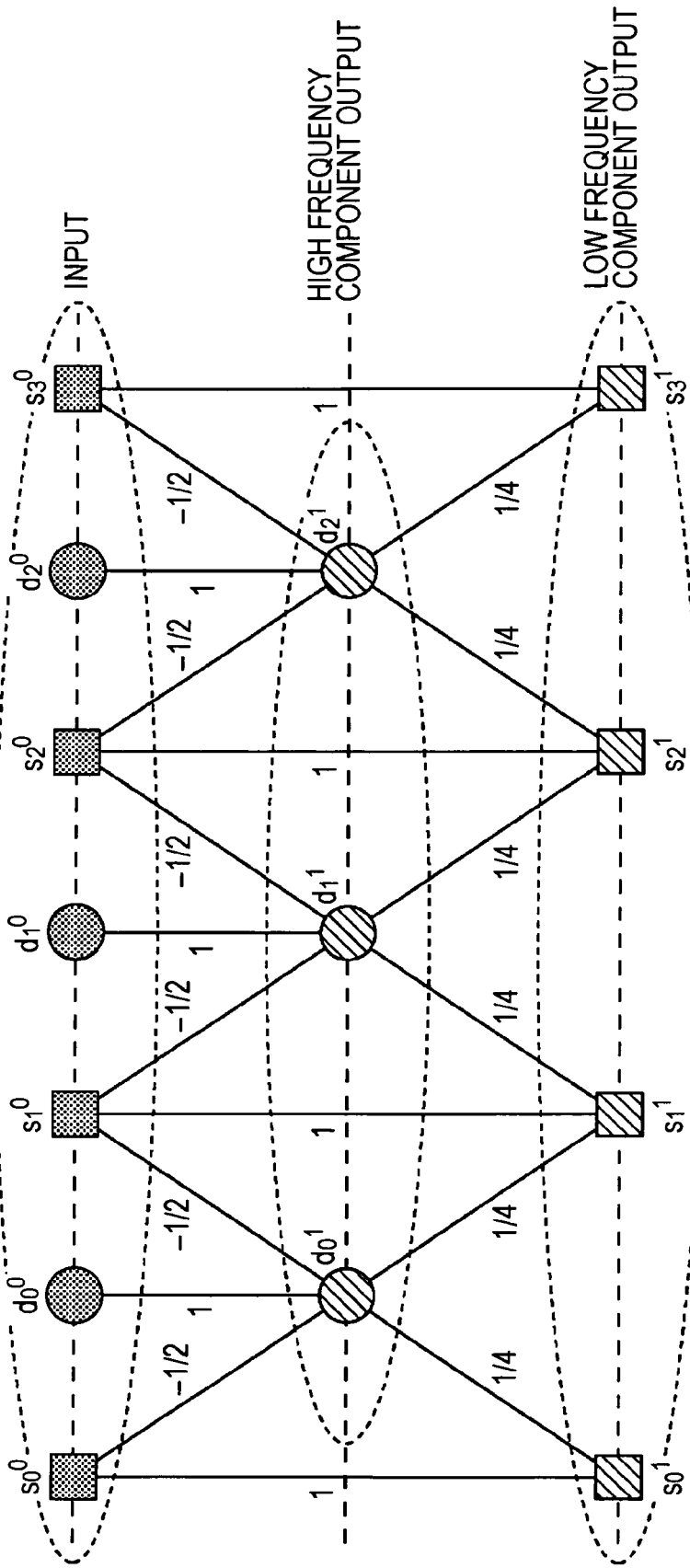
FIG. 4 is a diagram illustrating an example of a 5×3 analysis filter.

FIG. 4 is a diagram illustrating the 5×3 filter in a lifting manner. In the figure, one line positioned at the uppermost part is an input signal line. The data process is performed from the top of the image plane, and high frequency component coefficients (high frequency coefficients) and low frequency component coefficients (low frequency coefficients) are output based on the following equations (3) and (4).

$$di1=di0-\tfrac{1}{2}(si0+si+10) \quad (3)$$

$$si1=si0+\tfrac{1}{4}(di-11+di1) \quad (4)$$

Lifting Operation

Figure 5:
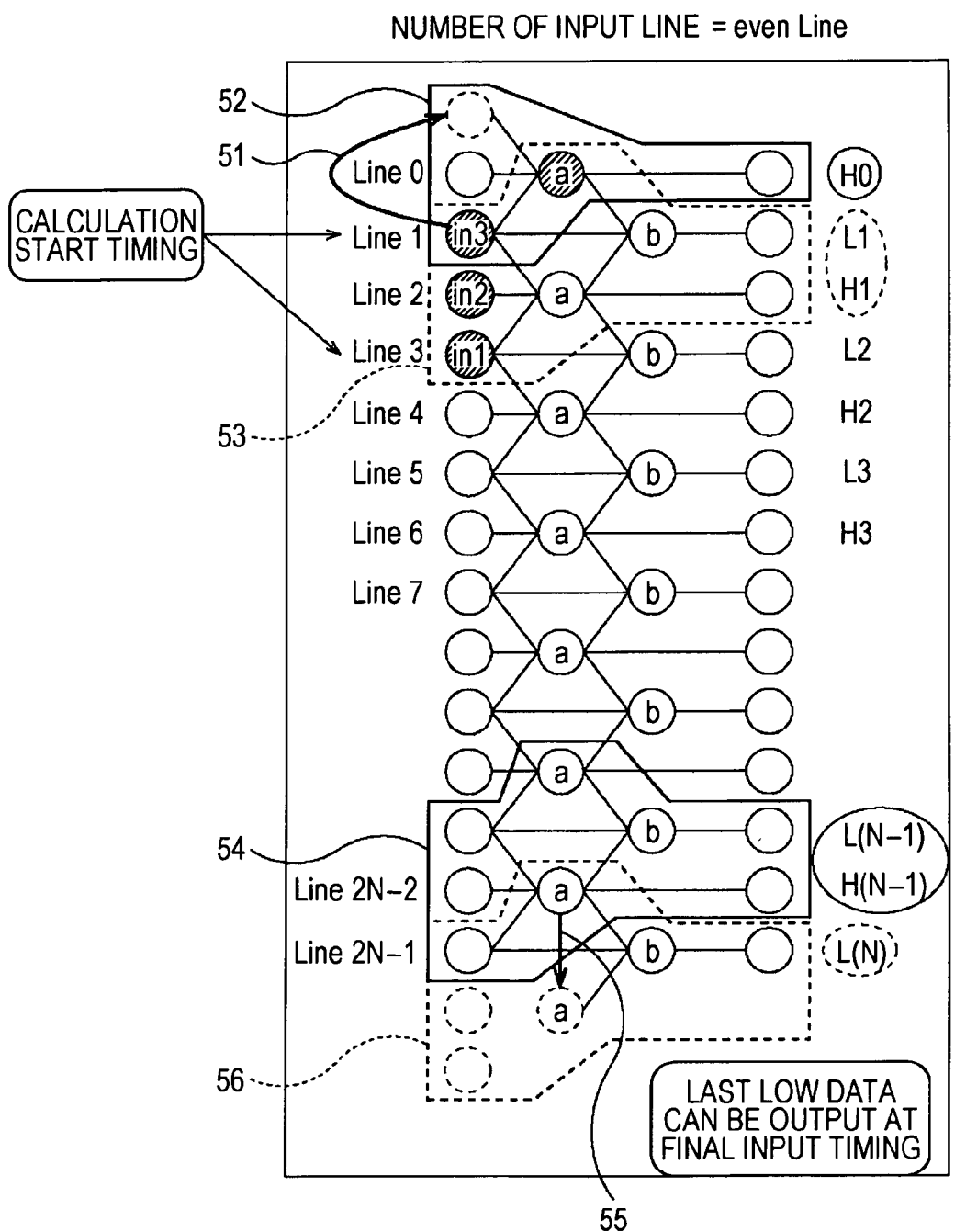
FIG. 5 is a diagram illustrating an example of a lifting operation of analysis filtering.

Next, the lifting operation will be described. FIG. 5 is a diagram illustrating a filtering performed for lines in the longitudinal direction in the lifting manner, using the 5×3 analysis filter.

The transverse direction shows operation procedures and low frequency and high frequency coefficients generated through the operation procedures. Upon comparison with the case in FIG. 4, it can be seen that the horizon is simply changed to the verticality, and the operation methods are exactly the same as each other.

In the upper end of the image, as marked with the arrow 51, the highest rank line is symmetrically expanded from the line 1 as in the dotted line so as to compensate for one line. As marked with the frame 52, using a total of three lines, this, the line 0, and the line 1, the lifting operation is performed, thereby generating the coefficient a in the first step. This is a high frequency coefficient H0.

If the line 1, the line 2, and the line 3 are input, using the three lines, a next high frequency coefficient a is calculated according to the equation (3). This is a high frequency coefficient H1. In addition, a total of three coefficients, the first high frequency coefficient a (H0), the second high frequency coefficient a (H1), and a coefficient of the line 1, the coefficient b is generated by the calculation according to the equation (4). This is a low frequency coefficient L1. That is to say, as marked with the frame 53, the low frequency coefficient L1 and the high frequency coefficient H1 are generated using the three lines, the line 1, the line 2, and the line 3, and the high frequency coefficient H0.

Thereafter, each time two lines are input, the lifting operation is repeatedly performed for subsequent lines in the same manner, and low frequency coefficients and high frequency coefficients are output. As marked with the frame 54, if the low frequency coefficient L(N−1) and the high frequency coefficient H(N−1) are generated, the high frequency coefficient H(N−1) is symmetrically expanded as in the arrow 55, and the low frequency coefficient L(N) is generated through the operation as marked with the frame 56.

Although FIG. 5 shows the example where the filtering is performed for the lines in the vertical direction, a filtering in the horizontal direction can be also considered in exactly the same manner.

The above-described lifting operation is performed for each hierarchy. Here, the analysis filtering is performed in an order for preferentially generating lower frequency components as described above. The order described with reference to FIG. 5 indicates a dependency relationship between data undergoing the analysis filtering, and is different from a performed order in actual processes.

One Line Block Process

Next, an order of the analysis filtering being performed will be described.

Image data (coefficient data) to be processed is sequentially processed from lines on a picture (sub-bands). The lifting operation in the analysis filtering is performed each time image data (coefficient data) to be processed of two lines is prepared (that is, as soon as it becomes possible to be performed). However, a relatively low frequency sub-band is preferentially processed.

As described below, the analysis filtering is repeatedly performed for each line block in the same order. Therefore, an order of the analysis filtering for line blocks (line blocks in a steady state) for which the analysis filtering is performed each time two lines are prepared will be described below.

In a picture in an initial state or line blocks including an upper end of a sub-band (line blocks in an initial state), the number of lines necessary for the analysis filtering is different from that in other line blocks (line blocks in the steady state). However, in the case of the line blocks in the initial state as well, an order of the analysis filtering process is fundamentally the same as that in other line blocks, and thus the description thereof will be omitted.

Figure 6:
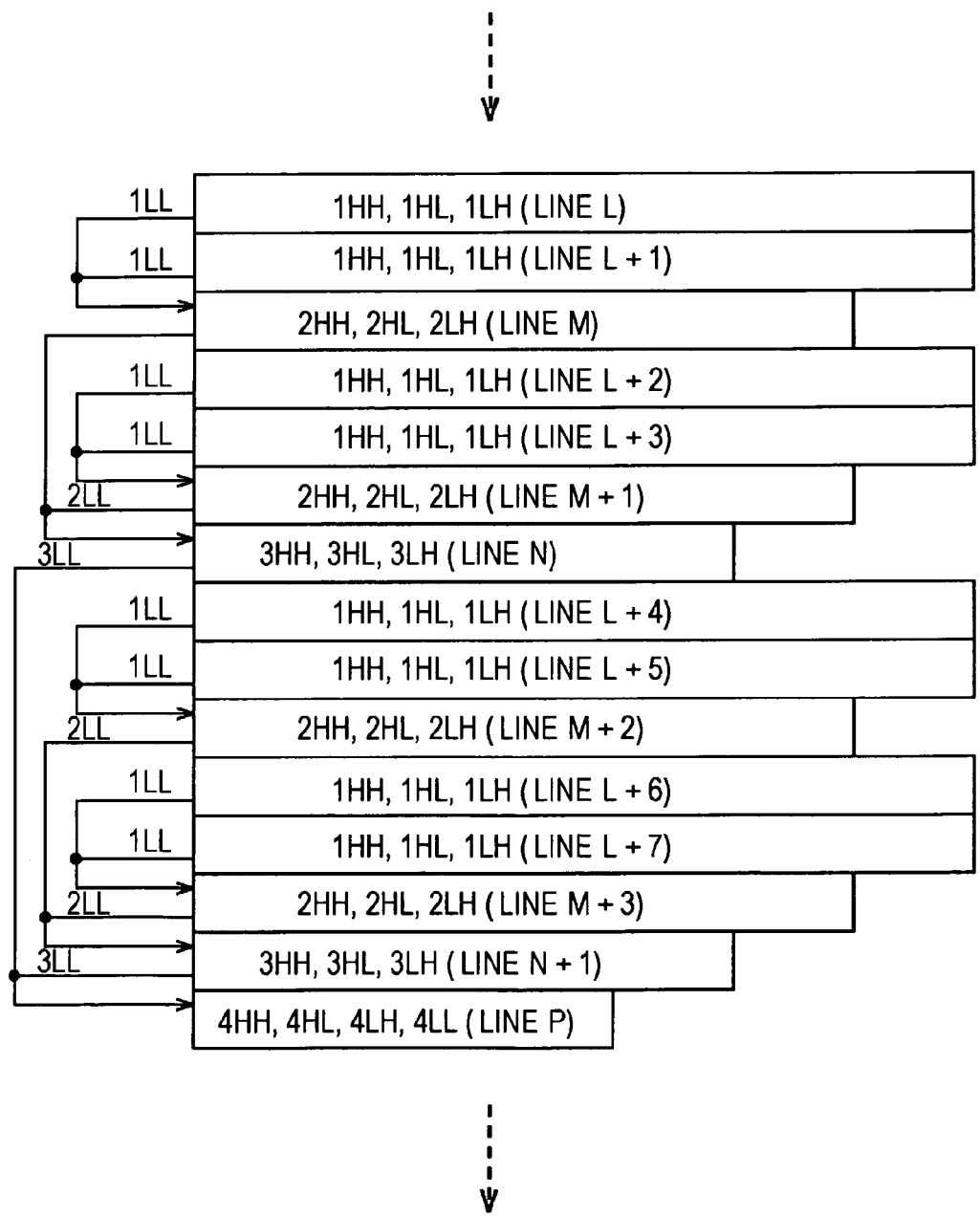
FIG. 6 is a diagram illustrating an example of an output order of coefficient data.

FIG. 6 is a diagram illustrating an output order of coefficient data in the steady state. In FIG. 6, wavelet-transformed coefficient data is arranged in a time-series from the top of the figure to the bottom thereof.

In the line blocks in the steady state, first, the analysis filtering is performed for two lines from above in a line block of image data in the baseband, thereby generating a line L of a division level 1 (an L-th coefficient line from above). Since the analysis filtering is not performed for coefficient data of one line, at the next timing, the subsequent two lines of the image data in the baseband undergo the analysis filtering, thereby generating a line L+1 of the division level 1 (a (L+1)-th coefficient line from above).

At this point in time, since the coefficient data of two lines of the division level 1 is prepared, next, the analysis filtering of the division level 1 is performed for the coefficient data of the two lines of the division level 1, thereby generating a line M of a division level 2 (an M-th coefficient line from above). However, since there is only one line, the analysis filtering of the division level 2 is not performed yet. Also, at this time, since coefficient data of the division level 1 is not prepared, the analysis filtering of the division level 1 also is not performed.

Therefore, the subsequent two lines of the image data in the baseband undergo the analysis filtering, thereby generating a line L+2 of the division level 1 (a (L+2)-th coefficient line from above). Since the analysis filtering is not performed for coefficient data of one line, successively, the subsequent two lines of the image data in the baseband undergo the analysis filtering, thereby generating a line L+3 of the division level 1 (a (L+3)-th coefficient line from above).

Since the coefficient data of two lines of the division level 1 is prepared, next, the analysis filtering of the division level 1 is performed for the coefficient data of the two lines of the division level 1, thereby generating a line M+1 of the division level 2 (a (M+1)-th coefficient line from above).

At this time, since the coefficient data of two lines of the division level 2 is prepared, next, the analysis filtering of the division level 2 is performed for the coefficient data of the two lines of the division level 2, thereby generating a line N of a division level 3 (an N-th coefficient line from above).

Hereinafter, by the same method, there is a sequential generation of a line L+4 of the division level 1 (a (L+4)-th coefficient line from above) and a line L+5 thereof (a (L+5)-th coefficient line from above), a line M+2 of the division level 2 (a (M+2)-th coefficient line from above), a line L+6 of the division level 1 (a (L+6)-th coefficient line from above) and a line L+7 thereof (a (L+7)-th coefficient line from above), a line M+3 of the division level 2 (a (M+3)-th coefficient line from above), and a line N+1 of the division level 3 (a (N+1)-th coefficient line from above).

Then, since the coefficient data of two lines of the division level 3 is prepared, next, the analysis filtering of the division level 3 is performed for the coefficient data of the two lines of the division level 3, thereby generating a line P of a division level 4 (a P-th coefficient line from above).

As described above, the analysis filtering for one line block is performed. That is to say, the above-described order is repeated for each line block.

The coefficient lines generated in the above-described order are arranged, for example, in an order of the inverse wavelet transform process, undergo inverse quantization and entropy encoding, and are then output as encoded data.

The encoded data generated in this way is transmitted to a decoding device via, for example, a communication path such as a network, or it is recorded on a recording medium and then supplied to a decoding device via the recording medium.

A transmission method of the encoded data to a decoding device is arbitrary. However, for example, like a live broadcasting, there is a case where it is requested to perform the entire process from the encoding of image data in the above-described encoding device to decoding of the encoded data in a decoding device in a lower delay manner (in real-time). For this, it is preferable to transmit the encoded data via the communication path such as a network rather than via the recording medium such that the encoding process and the decoding process are performed together.

However, even when the encoded data is recorded on the recording medium, it is possible to achieve an effect that the decoding device can decode the encoded data in a lower delay manner. That is to say, the decoding device can read the encoded data from the recording medium, decode it, and output the decoded image data in a lower delay manner.

Configuration of Decoding Device

Figure 7:
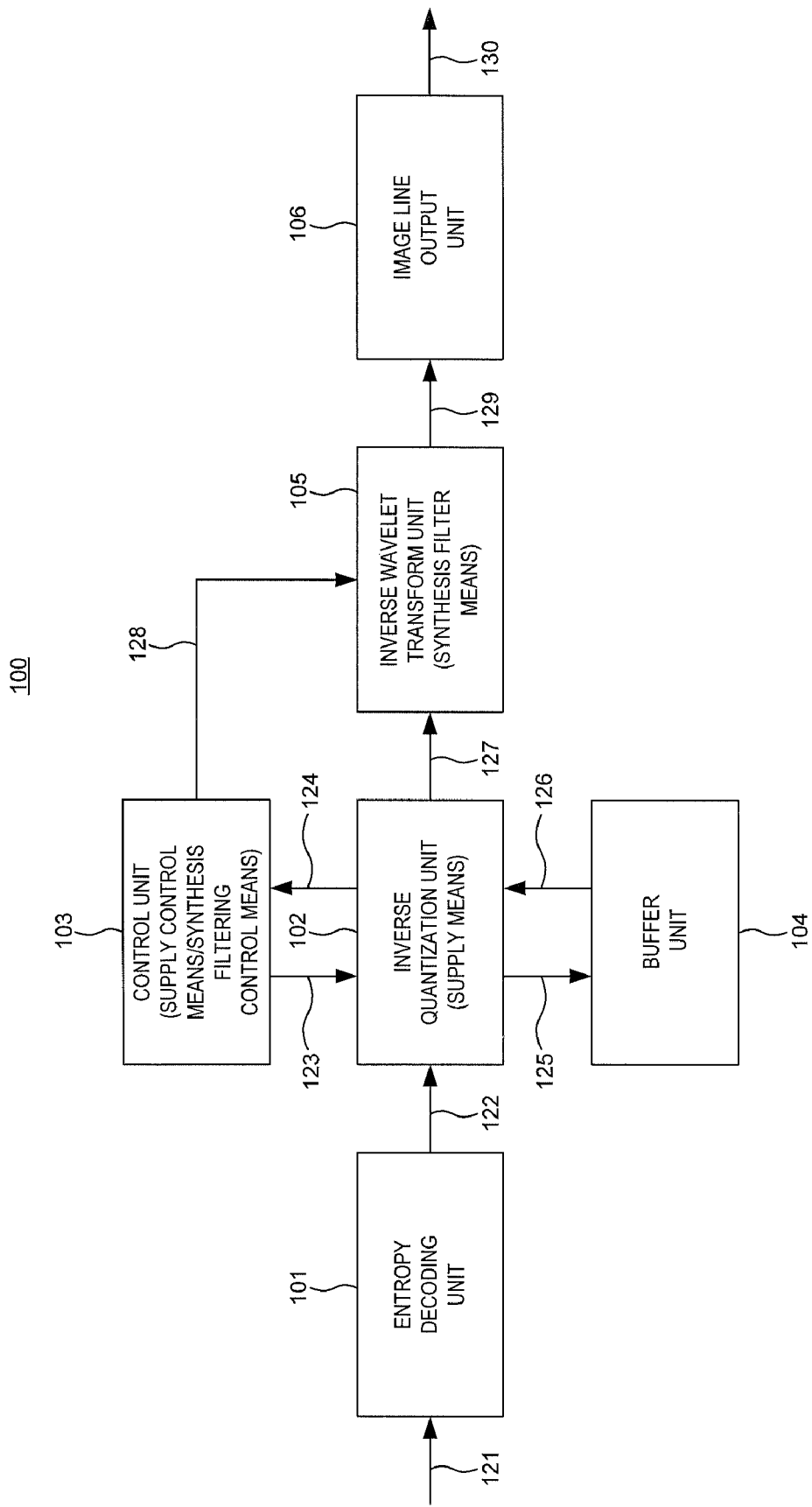
FIG. 7 is a block diagram illustrating an example of a main configuration of a decoding device according to an embodiment of the present invention.

FIG. 7 is a block diagram illustrating an example of a main configuration of a decoding device according to an embodiment of the present invention.

A decoding device 100 shown in FIG. 7 is a device corresponding to the encoding device 10 in FIG. 1. The decoding device 100 decodes the encoded data, which the encoding device 10 in FIG. 1 encodes image data to thereby generate, by a method corresponding to the encoding method by the encoding device 10, and then obtains decoded image data.

As shown in FIG. 7, the decoding device 100 has an entropy decoding unit 101, an inverse quantization unit 102, a control unit 103, a buffer unit 104, an inverse wavelet transform unit 105, and an image line output unit 106.

When the encoded data is input (the arrow 121), the entropy decoding unit 101 decodes the supplied encoded data by a decoding method corresponding to the encoding method by the entropy encoding unit 16 of the encoding device 10, and then obtains coefficient data (quantized coefficients). The entropy decoding unit 101 supplies the coefficient data to the inverse quantization unit 102 (the arrow 122).

The inverse quantization unit 102 inversely quantizes the coefficient data by a method corresponding to the quantization method by the quantization unit 15 of the encoding device 10, and then supplies the obtained coefficient data (wavelet coefficients) to the inverse wavelet transform unit 105 (the arrow 127).

The inverse wavelet transform unit 105 performs a synthesis filtering for the coefficient data by a method corresponding to the analysis filtering by the wavelet transform unit 11 of the encoding device 10, and generates decoded image data (image lines) in the baseband. The inverse wavelet transform unit 105 supplies the obtained image lines to the image line output unit 106 (the arrow 129).

The image line output unit 106 outputs the image lines in synchronization with horizontal synchronization signals of the video format of the decoded image data (the arrow 130).

When images of the decoded image data output from the image line output unit 106 is instantly (in real-time) displayed, it is necessary for the image line output unit 106 to output the image lines by one line every period between the horizontal synchronization signals (horizontal synchronization period). In other words, it is necessary for the inverse wavelet transform unit 105 to supply the image lines to the image line output unit 106 at a pace of one line for each horizontal synchronization period.

The details thereof will be described later, and the inverse wavelet transform unit 105 generates the image lines by two lines. Therefore, actually, it is necessary for the inverse wavelet transform unit 105 to supply the image lines of two lines to the image line output unit 106 every other horizontal synchronization period.

The control unit 103 controls outputs of the inverse quantization unit 102 and operations of the inverse wavelet transform unit 105 such that the inverse wavelet transform unit 105 generates the image lines at such timings.

Since a rate (a supplied amount per unit time) of the encoded data supplied to the decoding device 100 is fundamentally almost constant, the inverse quantization unit 102 temporarily stores the inversely quantized coefficient data in the buffer unit 104 (the arrow 125).

The control unit 103 controls the inverse quantization unit 102 (the arrow 123) based on information supplied from the inverse quantization unit 102 (the arrow 124) and in turn controls the reading of the coefficient data from the buffer unit 104 (the arrow 126).

By such a timing control, the output from the inverse quantization unit 102 (the arrow 127) is controlled. Also, the control unit 103 operates the inverse wavelet transform unit 105 in synchronization with the control (the arrow 128).

Before a timing control of the output of the inverse quantization unit 102 is described, the inverse wavelet transform process will be described.

5×3 Synthesis Filter

The inverse wavelet transform process is a process where the coefficient data for each frequency component constituted by hierarchy through the wavelet transform process is synthesized so as to return to image data in the baseband. As described above, in the wavelet transform process, the image data or the coefficient data is divided into the high component of the spatial frequency (high frequency component) and the low component of thereof (low frequency component) by analysis filtering, but a process inverse thereto is performed in the inverse wavelet transform process.

In other words, the synthesis filtering for synthesizing the coefficient data divided into the high frequency component and the low frequency component is performed for each division level. Therefore, the inverse wavelet transform process is performed using a filter the same as the filter used in the wavelet transform process. That is to say, when the 5×3 filter (analysis filter) is used as in the above-described example in the wavelet transform, the inverse wavelet transform is performed using the 5×3 filter (synthesis filter).

Figure 8:
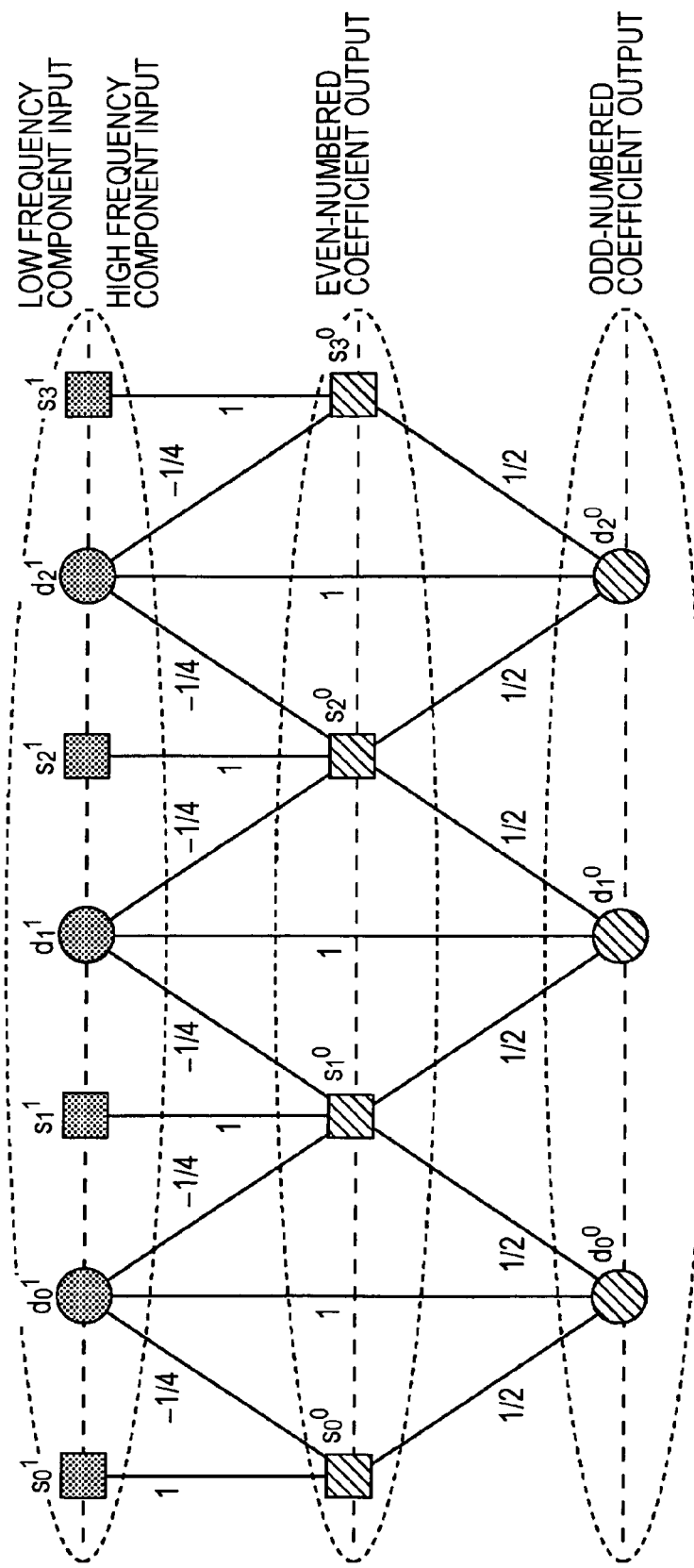
FIG. 8 is a diagram illustrating an example of a 5×3 synthesis filter.

FIG. 8 is a diagram illustrating the 5×3 synthesis filter in a lifting manner. In the figure, the input coefficients generated by the wavelet transform are shown at the uppermost part. The data process is performed from the top of the image plane to the bottom thereof, and even-numbered coefficient (first coefficient is assumed as 0-th) $si0$ and odd-numbered coefficient $di0$ are generated from the input coefficients of high frequency component (high frequency coefficient) and the input coefficients of low frequency component (low frequency coefficient) by the following equations (5) and (6).

$$si0 = si1 - \frac{1}{4}(di\text{-}11 + di1) \quad (5)$$

$$di0 = di1 + \frac{1}{2}(si0 + si + 10) \quad (6)$$

The synthesis filter side synthesizes the coefficients of the high frequency component and the low frequency component by the filtering process, and performs the inverse wavelet transform.

Lifting Operation

Figure 9:
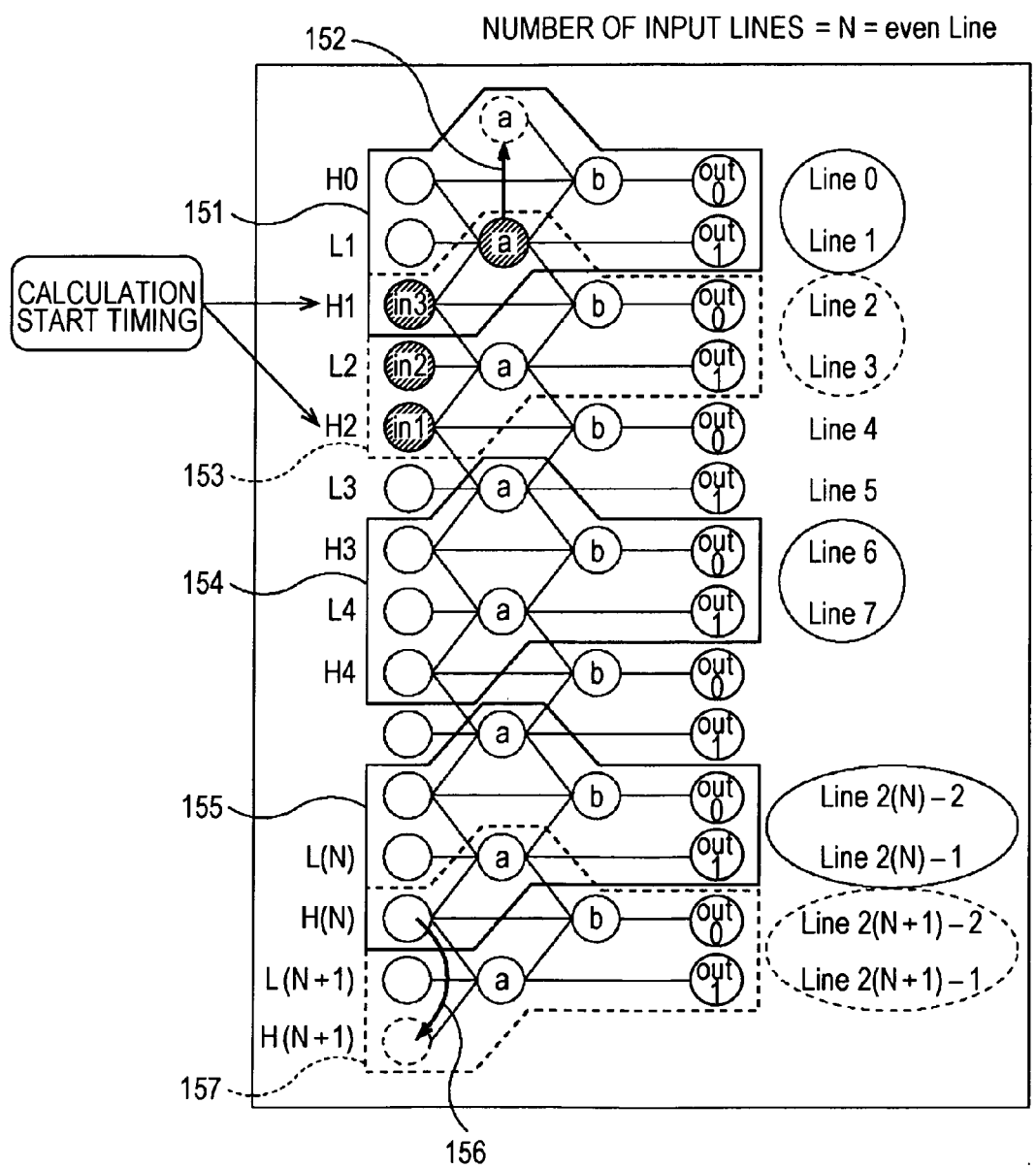
FIG. 9 is a diagram illustrating an example of a lifting operation of synthesis filtering.

FIG. 9 is a diagram illustrating a case where the filtering is performed for the lines in the longitudinal direction using the 5×3 synthesis filter. The transverse direction shows operation procedures and low rank coefficients generated through the operation procedures. In the same manner as the case of the analysis filtering, the process in the horizontal direction is also performed in the same manner as the process in the vertical direction. The synthesis filtering in the vertical direction is performed at first, and then the synthesis filtering in the horizontal direction is performed.

In the upper end of the image, as marked with the frame 151, the lifting operation is performed at a point of time when the high frequency coefficient H0, the low frequency coefficient L1, and the high frequency coefficient H1 are input. At this time, as marked with the arrow 152, the coefficient a is symmetrically enlarged. In this way, Line 0 and Line 1 in a lower rank hierarchy by one are generated.

Next, if two coefficient lines (the low frequency coefficient L2 and the high frequency coefficient H2) are input, as marked with the frame 153, Line 2 and Line 3 in a lower rank hierarchy by one are generated.

Thereafter, each time two coefficient lines are input, as marked with the frame 154, the lifting operation is repeatedly performed for subsequent lines in the same manner, to output lower rank coefficient lines of two lines. As marked with the frame 155, if Line 2(N)−2 and Line 2(N)−1 are generated from the input low frequency coefficient L(N) and the high frequency coefficient H(N), the high frequency coefficient H(N) is symmetrically expanded as marked with the arrow 156, and the operation is performed as marked with the frame 157 to generate Line 2(N+1)−2 and Line 2(N+1)−1.

Although FIG. 9 shows the example where the filtering is performed for the lines in the vertical direction, a filtering in the horizontal direction can be also considered in exactly the same manner.

The above-described lifting operation is performed for each hierarchy. Here, the synthesis filtering is performed in an order for preferentially generating higher frequency components as described above. The order described with reference to FIG. 9 indicates a dependency relationship between data undergoing the synthesis filtering, and is different from a performed order in actual processes.

One Line Block Process

Figure 10:
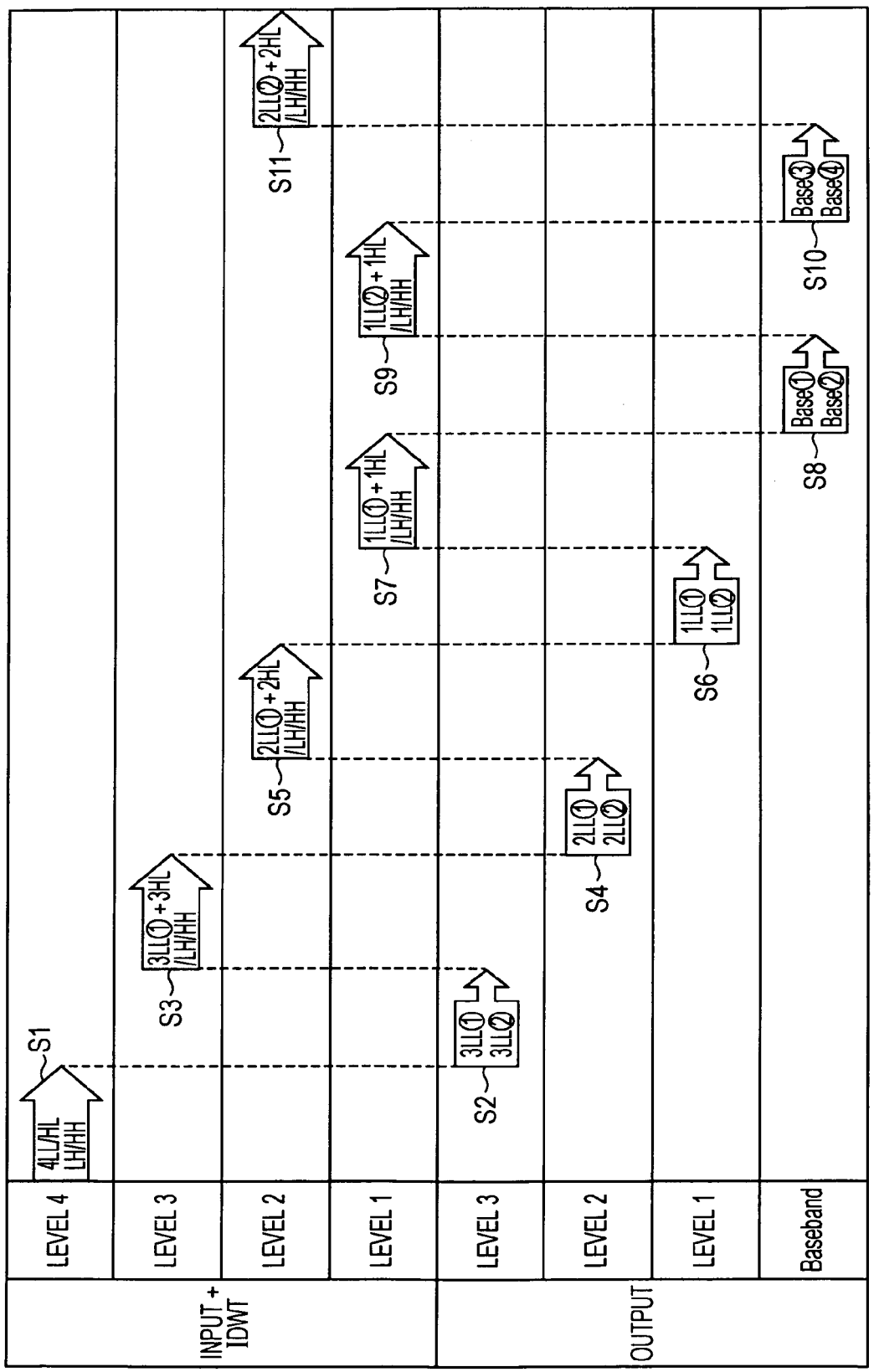
FIG. 10 is a diagram illustrating an order of an inverse wavelet transform process.
Figure 11:
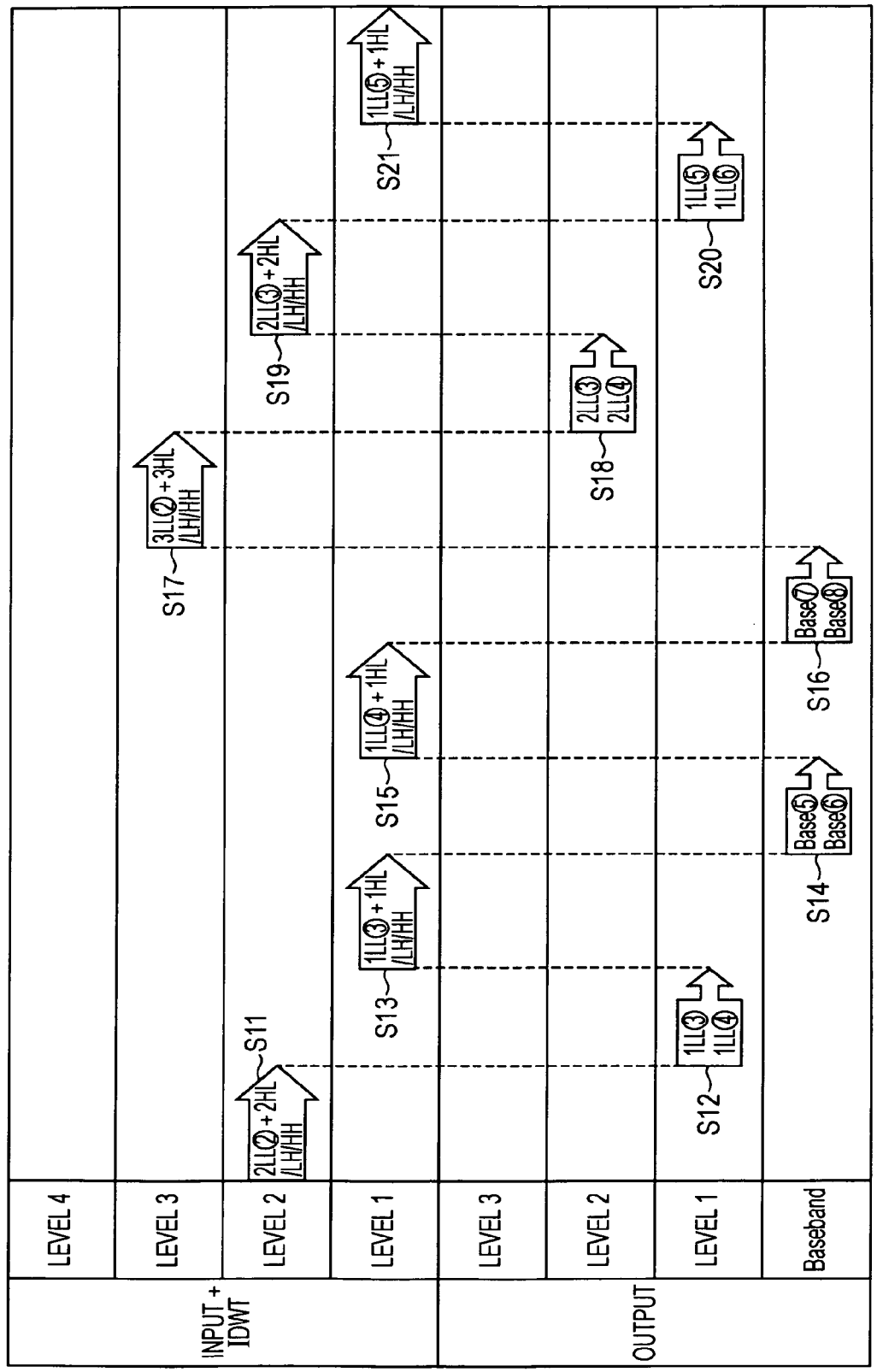
FIG. 11 is a diagram illustrating an order of the inverse wavelet transform process, which is subsequent to FIG. 10.
Figure 12:
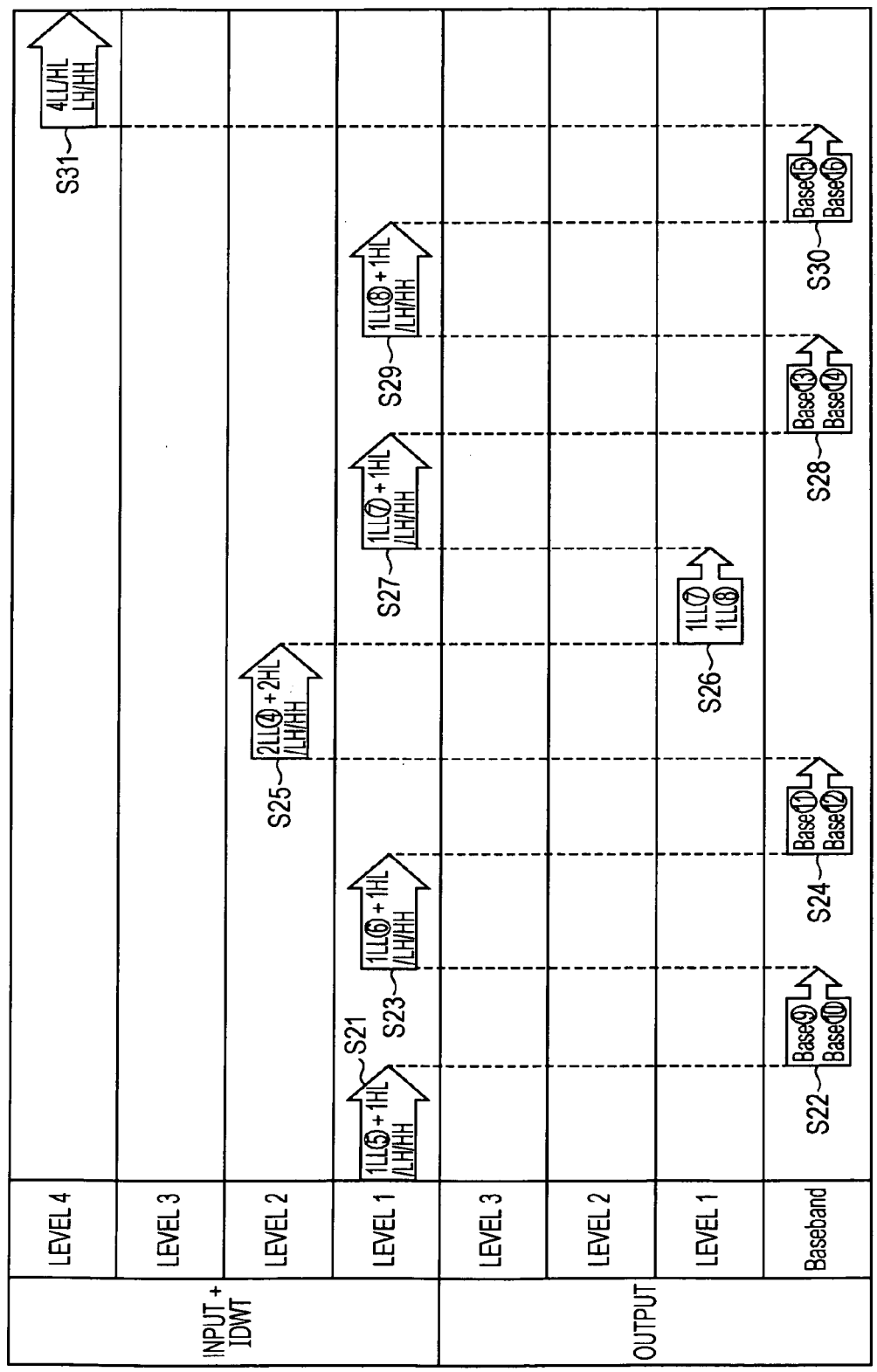
FIG. 12 is a diagram illustrating an order of the inverse wavelet transform process, which is subsequent to FIG. 11.

Next, a performed order of the synthesis filtering will be described with reference to FIGS. 10 to 12. In FIGS. 10 to 12, circled numbers are identification numbers of lines in the line blocks, and, in this specification, the circle surrounding the identification number is omitted and description is made. Also, here, the inverse wavelet transform process for coefficients which have undergone the wavelet transform with division level 4 will be described.

As shown in FIG. 10, initially, a first synthesis filtering is performed for coefficients (4LL/HL/LH/HH) of one line in each sub-band of the division level 4 which is the highest rank level (the arrow S1). By the first synthesis filtering, a coefficient 3LL1 of a first line and a coefficient 3LL2 of a second line in the low frequency sub-band of the division level 3 are generated (the arrow S2).

Next, a second synthesis filtering is performed for the coefficient 3LL1 of the first line and coefficients (3HL/LH/HH) of one line in each high frequency sub-band of the division level 3 which are newly input (the arrow S3). By the second synthesis filtering, a coefficient 2LL1 of a first line and a coefficient 2LL2 of a second line in the low frequency sub-band of the division level 2 are generated (the arrow S4).

Next, a third synthesis filtering is performed for the coefficient 2LL1 of the first line and coefficients (2HL/LH/HH) of one line in each high frequency sub-band of the division level 2 which are newly input (the arrow S5). By the third synthesis filtering, a coefficient 1LL1 of a first line and a coefficient 1LL2 of a second line in the low frequency sub-band of the division level 1 are generated (the arrow S6).

Also, a fourth synthesis filtering is performed for the coefficient 1LL1 of the first line and coefficients (1HL/LH/HH) of one line in each high frequency sub-band of the division level 1 which are newly input (the arrow S7). By the fourth synthesis filtering, image data Base 1 of a first line and image data Base 2 of a second line in the baseband are generated (the arrow S8).

Next, a fifth synthesis filtering is performed. Among the coefficient lines which are generated but not processed until now, the coefficient 1LL2 of the second line in the low frequency sub-band of the division level 1 which is a coefficient line of the lowest rank level becomes a target of the fifth synthesis filtering.

That is to say, the fifth synthesis filtering is performed for the coefficient 1LL2 of the second line in the low frequency sub-band of the division level 1 and the coefficients (1HL/LH/HH) of one line in each high frequency sub-band of the division level 1 which are newly input (the arrow S9). By the fifth synthesis filtering, image data Base 3 of a third line and image data Base 4 of a fourth line in the baseband are generated (the arrow S10).

Next, a sixth synthesis filtering is performed. Among the coefficient lines which are generated but not processed until now, the coefficient 2LL2 of the second line in the low frequency sub-band of the division level 2 which is a coefficient line of the lowest rank level becomes a target of the sixth synthesis filtering.

That is to say, the sixth synthesis filtering is performed for the coefficient 2LL2 of the second line in the low frequency sub-band of the division level 2 and the coefficients (2HL/LH/HH) of one line in each high frequency sub-band of the division level 2 which are newly input (the arrow S11). As shown in FIG. 11, by the sixth synthesis filtering, a coefficient 1LL3 of a third line and a coefficient 1LL4 of a fourth line in the low frequency sub-band of the division level 1 are generated (the arrow S12).

Next, a seventh synthesis filtering is performed for the coefficient 1LL3 of the third line in the low frequency sub-band of the division level 1 and coefficients (1HL/LH/HH) of one line in each high frequency sub-band of the division level 1 which are newly input (the arrow S13). By the seventh synthesis filtering, image data Base 5 of a fifth line and image data Base 6 of a sixth line in the baseband are generated (the arrow S14).

Next, an eighth synthesis filtering is performed. Among the coefficient lines which are generated but not processed until now, the coefficient 1LL4 of the fourth line in the low frequency sub-band of the division level 1 which is a coefficient line of the lowest rank level becomes a target of the eighth synthesis filtering.

That is to say, the eighth synthesis filtering is performed for the coefficient 1LL4 of the fourth line in the low frequency sub-band of the division level 1 and the coefficients (1HL/LH/HH) of one line in each high frequency sub-band of the division level 1 which are newly input (the arrow S15). By the eighth synthesis filtering, image data Base 7 of a seventh line and image data Base 8 of an eighth line in the baseband are generated (the arrow S16).

Next, a ninth synthesis filtering is performed. Among the coefficient lines which are generated but not processed until now, the coefficient 3LL2 of the second line in the low frequency sub-band of the division level 3 which is a coefficient line of the lowest rank level becomes a target of the ninth synthesis filtering.

That is to say, the ninth synthesis filtering is performed for the coefficient 3LL2 of the second line in the low frequency sub-band of the division level 3 and the coefficients (3HL/LH/HH) of one line in each high frequency sub-band of the division level 3 which are newly input (the arrow S17). By the ninth synthesis filtering, a coefficient 2LL3 of a third line and a coefficient 2LL4 of a fourth line in the low frequency sub-band of the division level 2 are generated (the arrow S18).

Next, a tenth synthesis filtering is performed for the coefficient 2LL3 of the third line and the coefficients (2HL/LH/HH) of one line in each high frequency sub-band of the division level 2 which are newly input (the arrow S19).

By the tenth synthesis filtering, a coefficient 1LL5 of a fifth line and a coefficient 1LL6 of a sixth line in the low frequency sub-band of the division level 1 are generated (the arrow S20).

Also, an eleventh synthesis filtering is performed for the coefficient 1LL5 of the fifth line and the coefficients (1HL/LH/HH) of one line in each high frequency sub-band of the division level 1 which are newly input (the arrow S21). As shown in FIG. 12, by the eleventh synthesis filtering, image data Base 9 of a ninth line and image data Base 10 of a tenth line in the baseband are generated (the arrow S22).

Next, a twelfth synthesis filtering is performed. Among the coefficient lines which are generated but not processed until now, the coefficient 1LL6 of the sixth line in the low frequency sub-band of the division level b 1 which is a coefficient line of the lowest rank level becomes a target of the twelfth synthesis filtering.

That is to say, the twelfth synthesis filtering is performed for the coefficient 1LL6 of the sixth line in the low frequency sub-band of the division level 1 and the coefficients (1HL/LH/HH) of one line in each high frequency sub-band of the division level 1 which are newly input (the arrow S23). By the twelfth synthesis filtering, image data Base 11 of an eleventh line and image data Base 12 of a twelfth line in the baseband are generated (the arrow S24).

Next, a thirteenth synthesis filtering is performed. Among the coefficient lines which are generated but not processed until now, the coefficient 2LL4 of the fourth line in the low frequency sub-band of the division level 2 which is a coefficient line of the lowest rank level becomes a target of the thirteenth synthesis filtering.

That is to say, the thirteenth synthesis filtering is performed for the coefficient 2LL4 of the fourth line in the low frequency sub-band of the division level 2 and the coefficients (2HL/LH/HH) of one line in each high frequency sub-band of the division level 2 which are newly input (the arrow S25). By the thirteenth synthesis filtering, a coefficient 1LL7 of a seventh line and a coefficient 1LL8 of an eighth line in the low frequency sub-band of the division level 1 are generated (the arrow S26).

Further, a fourteenth synthesis filtering is performed for the coefficient 1LL7 of the seventh line in the low frequency sub-band of the division level 1 and the coefficients (1HL/LH/HH) of one line in each high frequency sub-band of the division level 1 which are newly input (the arrow S27). By the fourteenth synthesis filtering, image data Base 13 of a thirteenth line and image data Base 14 of a fourteenth line in the baseband are generated (the arrow S28).

Next, a fifteenth synthesis filtering is performed. Among the coefficient lines which are generated but not processed until now, the coefficient 1LL8 of the eighth line in the low frequency sub-band of the division level 1 which is a coefficient line of the lowest rank level becomes a target of the fifteenth synthesis filtering.

That is to say, the fifteenth synthesis filtering is performed for the coefficient 1LL8 of the eighth line in the low frequency sub-band of the division level 1 and the coefficients (1HL/LH/HH) of one line in each high frequency sub-band of the division level 1 which are newly input (the arrow S29). By the fifteenth synthesis filtering, image data Base 15 of a fifteenth line and image data Base 16 of a sixteenth line in the baseband are generated (the arrow S30).

In the above-described order, the synthesis filtering for one line block is performed. By the repeated synthesis filtering in the above-described order, image data (sixteen lines) of one line block in the baseband is generated.

The same process as described above is repeated for a next line block (the arrow S31).

In order to output the image lines in synchronization with the horizontal synchronization signals of the decoded image data, it is necessary to control generation timings of the image lines in the baseband, that is, timings of the synthesis filtering.

Particularly, in the above-described order, as shown in FIGS. 10 to 12, the number of the synthesis filtering necessary for generating the image lines of two lines in the baseband varies. Specifically, the image lines are generated by the fourth, fifth, seventh, eighth, eleventh, twelfth, fourteenth, and fifteenth synthesis filterings.

That is to say, four synthesis filterings are necessary in order to generate first two lines, but only one synthesis filtering is performed in order to generate next two lines. In the same manner below, the number of the synthesis filterings varies.

Therefore, if the decoding device 100 sequentially performs the synthesis filtering for the coefficient lines obtained by processing the supplied encoded lines in a haphazard fashion, there is a problem in that great deviation is generated in the generation timings of the image lines in the baseband and it is difficult to output the image lines in synchronization with the horizontal synchronization signals of the decoded image data.

Thereby, the control unit 103 controls the inverse quantization unit 102 and the inverse wavelet transform unit 105 such that the inverse wavelet transform unit 105 generates the image lines in the baseband once (two lines) every other period between horizontal synchronization signals (every other horizontal synchronization period).

In addition, a length of the horizontal synchronization period is dependent on a vertical resolution or a frame rate of an image and is defined as one of the video formats. Therefore, the control unit 103 performs the control according to a video format of coefficient data (decoded image data) to be processed.

Details are described later, and an input timing of the coefficient line to the inverse wavelet transform unit 105 is adjusted using the buffer unit 104. Thus, the control unit 103 performs the control such that generation of overflow or underflow in the buffer unit 104 is suppressed.

Particularly, easy generation of the overflow or the underflow is different depending on a video format of the processed coefficient data (decoded image data). Thereby, the control unit 103 performs controls according to the video format.

Hereinafter, the controls will be described.

Configurations of Control Unit and Inverse Quantization Unit

Figure 13:
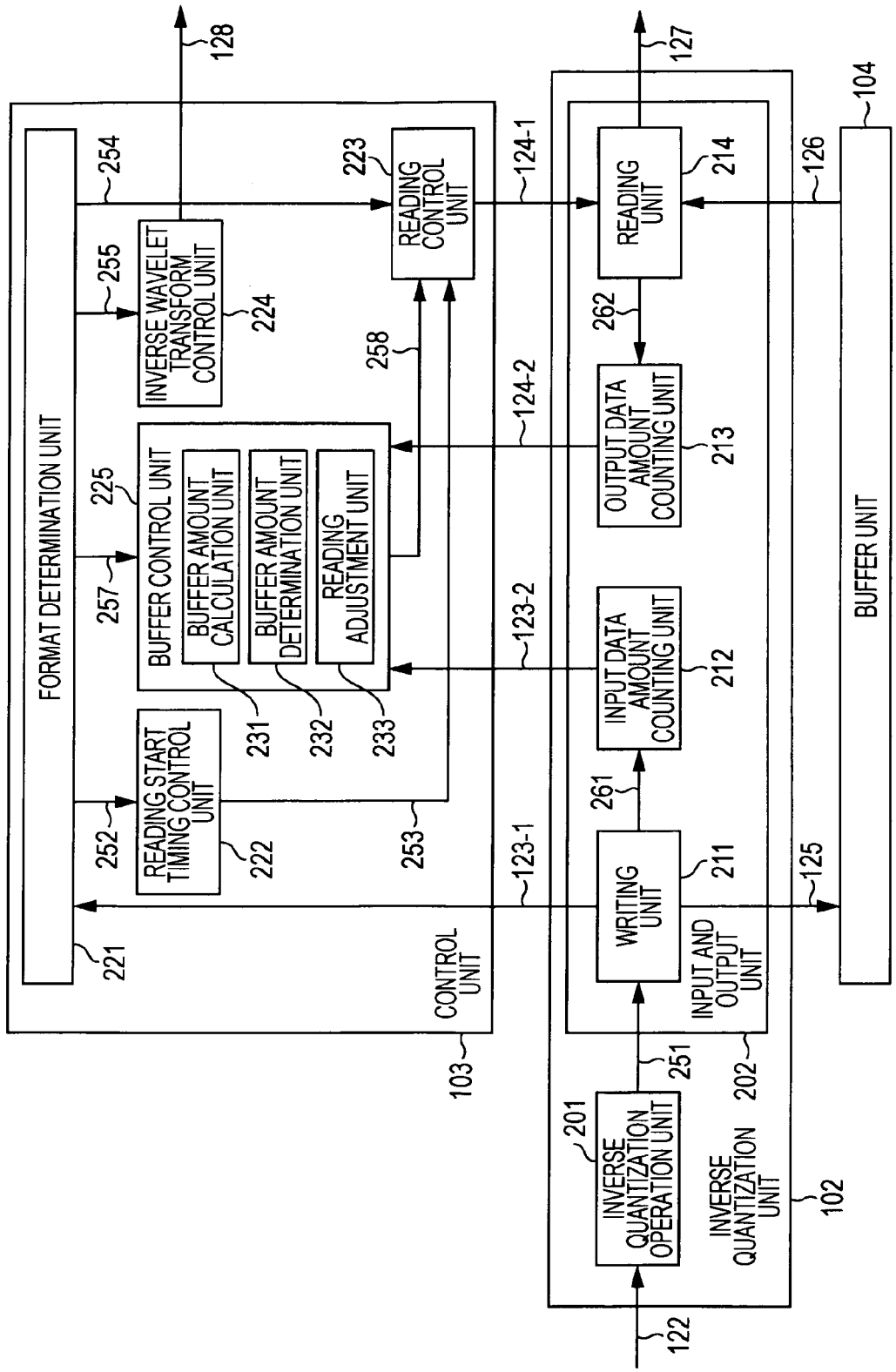
FIG. 13 is a block diagram illustrating detailed configuration examples of the control unit and the inverse quantization unit in FIG. 7.

FIG. 13 is a block diagram illustrating an example of a main configuration of the inverse quantization unit 102 and the control unit 103 in FIG. 7.

As shown in FIG. 13, the inverse quantization unit 102 has an inverse quantization operation unit 201 and an input and output unit 202. The inverse quantization operation unit 201 performs an inverse quantization operation for the input quantized coefficient (the arrow 122). The inversely quantized coefficient data is supplied to the input and output unit 202 (the arrow 251).

The input and output unit 202 is operated as an interface of the buffer unit 104, and writes the inversely quantized coefficient data supplied from the inverse quantization operation unit 201 in the buffer unit 104 (the arrow 125) or reads the inversely quantized coefficient data from the buffer unit 104 (the arrow 126). The input and output unit 202 is operated under the control of the control unit 103 (the arrows 123-1, 123-2, 124-1 and 124-2).

The input and output unit 202 includes a writing unit 211, an input data amount counting unit 212, an output data amount counting unit 213, and a reading unit 214.

The writing unit 211 supplies the coefficient data supplied from the inverse quantization operation unit 201 to the buffer unit 104 to be stored (the arrow 125).

The writing unit 211 obtains a video format of the coefficient data from, for example, an arbitrary portion such as a header of the coefficient data, and supplies information for the video format to the control unit 103 (the arrow 123-1).

The writing unit 211 also supplies the coefficient data written in the buffer unit 104 to the input data amount counting unit 212 (the arrow 261).

The input data amount counting unit 212 counts a data amount of the coefficient data supplied from the writing unit 211. The input data amount counting unit 212 supplies the counted value to the control unit 103 (the arrow 123-2).

The reading unit 214 reads the coefficient data from the buffer unit 104 (the arrow 126) and supplies the read coefficient data to the inverse wavelet transform unit 105 (the arrow 127) under the control of the control unit 103 (the arrow 124-1).

Further, the reading unit 214 supplies the coefficient data read from the buffer unit 104 to the output data amount counting unit 213.

The output data amount counting unit 213 counts a data amount of the coefficient data supplied from the reading unit 214. The output data amount counting unit 213 supplies the counted value to the control unit 103 (the arrow 124-2).

The control unit 103 has a format determination unit 221, a reading start timing control unit 222, a reading control unit 223, an inverse wavelet transform control unit 224, and a buffer control unit 225.

The format determination unit 221 determines what characteristics the video format of the coefficient lines (decoded image data) to be processed has, based on the information for the video format supplied from the inverse quantization unit 102 (the arrow 123-1).

For example, the format determination unit 221 determines a length of a horizontal synchronization period or a horizontal blank interval of an image signal.

For example, as shown in FIG. 14, in a case of an image having a valid horizontal size of 1920 samples, and the number of valid vertical lines of 1080 in an interlacing scanning method of 60 fields per second (1920×1080@60i), the horizontal size (horizontal synchronization period) becomes 2200 samples and the valid horizontal size becomes 1920 samples. In this case, an H blank value (horizontal blank interval) is 280 samples.

In addition, for example, as shown in FIG. 14, in a case of an image having a valid horizontal size of 1280 samples, and the number of valid vertical lines of 720 in a progressive scanning method of 24 fields per second (1280×720@24p), the horizontal size (horizontal synchronization period) becomes 4125 samples and the valid horizontal size becomes 1280 samples. In this case, the H blank value (horizontal blank interval) is 2845 samples.

Figure 15:
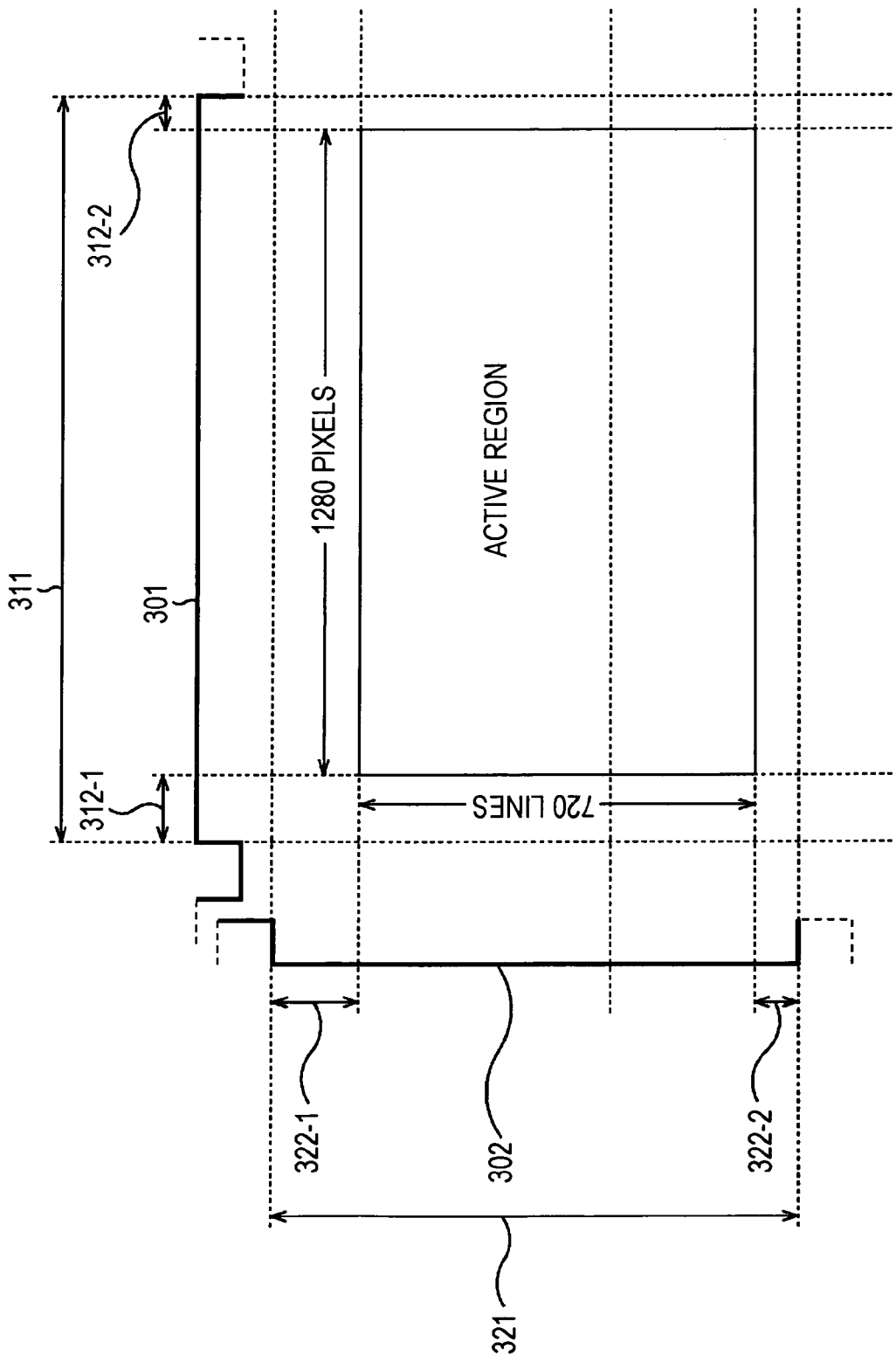
FIG. 15 is a diagram illustrating a configuration example of image data.

For example, as shown in FIG. 15, a horizontal synchronization period 311 which corresponds to an interval between pulses of the horizontal synchronization signal 301 (also referred to as "between horizontal synchronization signals") includes a horizontal blank interval 312-1 and a horizontal blank interval 312-2 before and after the horizontal display region included in an active region. Hereinafter, in a case where it is not necessary to differentiate the horizontal blank interval 312-1 from the horizontal blank interval 312-2, they are simply referred to as a horizontal blank interval 312.

Therefore, in displaying images, one line of an image signal is displayed, then the horizontal blank interval 312 comes, and thereafter a next line is displayed.

Also, a vertical synchronization signal 302 is configured in the same manner, and a vertical synchronization period 321 which corresponds to an interval between pulses of the vertical synchronization signal 302 (also referred to as between the vertical synchronization signals) includes a vertical blank interval 322-1 and a vertical blank interval 322-2 before and after a vertical display region included in the active region. Hereinafter, in a case where it is not necessary to differentiate the vertical blank interval 322-1 from the vertical blank interval 322-2, they are simply referred to as a vertical blank interval 322.

Here, an important thing is that it is necessary for the image line output unit 106 to output image lines in the baseband by one line during each horizontal synchronization period. For this, it is necessary for the inverse wavelet transform unit 105 to perform the synthesis filtering so as to output the image data in the baseband by two lines every other horizontal synchronization period.

Referring to FIG. 13 again, the format determination unit 221 notifies the reading control unit 223 and the inverse wavelet transform control unit 224 of the resultant determination of the characteristics of such video formats (the arrows 254 and 255).

The reading control unit 223 controls the reading unit 214 based on the resultant determination so as to read the coefficient data from the buffer unit 104 at such a timing that the inverse wavelet transform unit 105 can output the image data in the baseband by two lines every other horizontal synchronization period, and then makes the read coefficient data supplied to the inverse wavelet transform unit 105.

The inverse wavelet transform control unit 224 controls the inverse wavelet transform unit 105 so as to perform the synthesis filtering in synchronization with at the supplied timing of the coefficient data.

When the synthesis filtering is performed in the order described with reference to FIGS. 10 to 12, a control of one line block will be described in more detail. Also, hereinafter, an order of the coefficient line or an image line (an arbitrary line) will be described using a leading portion of a line block as a reference.

When the first horizontal synchronization period for the line block is initiated, the reading control unit 223 controls the reading unit 214 to read the coefficient lines in the sub-bands 4LL, 4HL, 4LH and 4HH by one line from the buffer unit 104 at a predetermined timing, and then makes the read lines supplied to the inverse wavelet transform unit 105. The inverse wavelet transform control unit 224 makes the synthesis filtering marked with the arrow S1 in FIG. 10 performed for the supplied coefficient lines, thereby generating two coefficient lines in the sub-band 3LL.

Next, the reading control unit 223 controls the reading unit 214 to read the first coefficient lines in the sub-bands 3HL, 3LH and 3HH at a predetermined timing, and then makes the read lines supplied to the inverse wavelet transform unit 105. The inverse wavelet transform control unit 224 makes the synthesis filtering marked with the arrow S3 in FIG. 10 performed for the generated first coefficient line in the sub-band 3LL and the supplied coefficient lines thereof, thereby generating two coefficient lines in the sub-band 2LL.

Then, the reading control unit 223 controls the reading unit 214 to read the first coefficient lines in the sub-bands 2HL, 2LH and 2HH from the buffer unit 104 at a predetermined timing, and then makes the read lines supplied to the inverse wavelet transform unit 105. The inverse wavelet transform control unit 224 makes the synthesis filtering marked with the arrow S5 in FIG. 10 performed for the generated first coefficient line in the sub-band 2LL and the supplied coefficient lines thereof, thereby generating two coefficient lines in the sub-band 1LL.

Next, the reading control unit 223 controls the reading unit 214 to read the first coefficient lines in the sub-bands 1HL, 1LH and 1HH from the buffer unit 104 from the buffer unit 104 at a predetermined timing, and then makes the read lines supplied to the inverse wavelet transform unit 105. The inverse wavelet transform control unit 224 makes the synthesis filtering marked with the arrow S7 in FIG. 10 performed for the generated first coefficient line in the sub-band 1LL and the supplied coefficient lines thereof, thereby generating two image lines in the baseband.

The reading control unit 223 and the inverse wavelet transform control unit 224 perform these controls at such timings that the inverse wavelet transform unit 105 performs four synthesis filterings to generate the two image lines in the baseband during the first horizontal synchronization period for the line block.

The image line output unit 106 outputs the two generated lines during the first horizontal synchronization period and the second horizontal synchronization period.

If the coefficient lines are read as described above, the reading control unit 223 controls the reading unit 214 to read the second coefficient lines in the sub-bands 1HL, 1LH and 1HH from the buffer unit 104 at a predetermined timing, and then makes the read lines supplied to the inverse wavelet transform unit 105. The inverse wavelet transform control unit 224 makes the synthesis filtering marked with the arrow S9 in FIG. 10 performed for the generated second coefficient line of the sub-band 1LL and the supplied coefficient lines thereof, thereby generating two image lines in the baseband.

The reading control unit 223 and the inverse wavelet transform control unit 224 perform these controls at such timings that the inverse wavelet transform unit 105 performs one synthesis filtering to generate the two image lines in the baseband during the third horizontal synchronization period.

The image line output unit 106 outputs the two generated lines during the third horizontal synchronization period and the fourth horizontal synchronization period.

If the coefficient lines are read as described above, the reading control unit 223 controls the reading unit 214 to read the second coefficient lines in the sub-bands 2HL, 2LH and 2HH from the buffer unit 104 at a predetermined timing, and then makes the read lines supplied to the inverse wavelet transform unit 105. The inverse wavelet transform control unit 224 makes the synthesis filtering marked with the arrow S11 in FIG. 10 performed for the generated second coefficient line of the sub-band 2LL and the supplied coefficient lines thereof, thereby generating two coefficient lines in the sub-band 1LL.

Next, the reading control unit 223 controls the reading unit 214 to read the third coefficient lines in the sub-bands 1HL, 1LH and 1HH from the buffer unit 104 at a predetermined timing, and then makes the read lines supplied to the inverse wavelet transform unit 105. The inverse wavelet transform control unit 224 makes the synthesis filtering marked with the arrow S13 in FIG. 11 performed for the generated third coefficient line of the sub-band 1LL and the supplied coefficient lines thereof, thereby generating two image lines in the baseband.

The reading control unit 223 and the inverse wavelet transform control unit 224 perform these controls at such timings that the inverse wavelet transform unit 105 performs two synthesis filterings to generate the two image lines in the baseband during the fifth horizontal synchronization period.

The image line output unit 106 outputs the two generated lines during the fifth horizontal synchronization period and the sixth horizontal synchronization period.

If the coefficient lines are read as described above, the reading control unit 223 controls the reading unit 214 to read the fourth coefficient lines in the sub-bands 1HL, 1LH and 1HH from the buffer unit 104 at a predetermined timing, and then makes the read lines supplied to the inverse wavelet transform unit 105. The inverse wavelet transform control unit 224 makes the synthesis filtering marked with the arrow S15 in FIG. 11 performed for the generated fourth coefficient line of the sub-band 1LL and the supplied coefficient lines thereof, thereby generating two image lines in the baseband.

The reading control unit 223 and the inverse wavelet transform control unit 224 perform these controls at such timings that the inverse wavelet transform unit 105 performs one synthesis filtering to generate the two image lines in the baseband during the seventh horizontal synchronization period.

The image line output unit 106 outputs the two generated lines during the seventh horizontal synchronization period and the eighth horizontal synchronization period.

If the coefficient lines are read as described above, the reading control unit 223 controls the reading unit 214 to read the second coefficient lines in the sub-bands 3HL, 3LH and 3HH from the buffer unit 104 at a predetermined timing, and then makes the read lines supplied to the inverse wavelet transform unit 105. The inverse wavelet transform control unit 224 makes the synthesis filtering marked with the arrow S17 in FIG. 11 performed for the generated second coefficient line in the sub-band 3LL and the supplied coefficient lines thereof, thereby generating two coefficient lines in the sub-band 2LL.

Then, the reading control unit 223 controls the reading unit 214 to read the third coefficient lines in the sub-bands 2HL, 2LH and 2HH from the buffer unit 104 at a predetermined timing, and then makes the read lines supplied to the inverse wavelet transform unit 105. The inverse wavelet transform control unit 224 makes the synthesis filtering marked with the arrow S19 in FIG. 11 performed for the generated third coefficient line in the sub-band 2LL and the supplied coefficient lines thereof, thereby generating two image lines in the baseband.

Next, the reading control unit 223 controls the reading unit 214 to read the fifth coefficient lines in the sub-bands 1HL, 1LH and 1HH from the buffer unit 104 at a predetermined timing, and then makes the read lines supplied to the inverse wavelet transform unit 105. The inverse wavelet transform control unit 224 makes the synthesis filtering marked with the arrow S21 in FIG. 11 performed for the generated fifth coefficient line of the sub-band 1LL and the supplied coefficient lines thereof, thereby generating two image lines in the baseband.

The reading control unit 223 and the inverse wavelet transform control unit 224 perform these controls at such timings that the inverse wavelet transform unit 105 performs three synthesis filterings to generate the two image lines in the baseband during the ninth horizontal synchronization period.

The image line output unit 106 outputs the two generated lines during the ninth horizontal synchronization period and the tenth horizontal synchronization period.

If the coefficient lines are read as described above, the reading control unit 223 controls the reading unit 214 to read the sixth coefficient lines in the sub-bands 1HL, 1LH and 1HH from the buffer unit 104 at a predetermined timing, and then makes the read lines supplied to the inverse wavelet transform unit 105. The inverse wavelet transform control unit 224 makes the synthesis filtering marked with the arrow S23 in FIG. 12 performed for the generated sixth coefficient line of the sub-band 1LL and the supplied coefficient lines thereof, thereby generating two image lines in the baseband.

The reading control unit 223 and the inverse wavelet transform control unit 224 perform these controls at such timings that the inverse wavelet transform unit 105 performs one synthesis filtering to generate the two image lines in the baseband during the eleventh horizontal synchronization period.

The image line output unit 106 outputs the two generated lines during the eleventh horizontal synchronization period and the twelfth horizontal synchronization period.

If the coefficient lines are read as described above, the reading control unit 223 controls the reading unit 214 to read the fourth coefficient lines in the sub-bands 2HL, 2LH and 2HH from the buffer unit 104 at a predetermined timing, and then makes the read lines supplied to the inverse wavelet transform unit 105. The inverse wavelet transform control unit 224 makes the synthesis filtering marked with the arrow S25 in FIG. 12 performed for the generated fourth coefficient line of the sub-band 2LL and the supplied coefficient lines thereof, thereby generating two coefficient lines in the sub-band 1LL.

Next, the reading control unit 223 controls the reading unit 214 to read the seventh coefficient lines in the sub-bands 1HL, 1LH and 1HH from the buffer unit 104 at a predetermined timing, and then makes the read lines supplied to the inverse wavelet transform unit 105. The inverse wavelet transform control unit 224 makes the synthesis filtering marked with the arrow S27 in FIG. 12 performed for the generated seventh coefficient line of the sub-band 1LL and the supplied coefficient lines thereof, thereby generating two image lines in the baseband.

The reading control unit 223 and the inverse wavelet transform control unit 224 perform these controls at such timings that the inverse wavelet transform unit 105 performs two synthesis filterings to generate the two image lines in the baseband during the thirteenth horizontal synchronization period.

The image line output unit 106 outputs the two generated lines during the thirteenth horizontal synchronization period and the fourteenth horizontal synchronization period.

If the coefficient lines are read as described above, the reading control unit 223 controls the reading unit 214 to read the eighth coefficient lines in the sub-bands 1HL, 1LH and 1HH from the buffer unit 104 at a predetermined timing, and then makes the read lines supplied to the inverse wavelet transform unit 105. The inverse wavelet transform control unit 224 makes the synthesis filtering marked with the arrow S29 in FIG. 12 performed for the generated eighth coefficient line of the sub-band 1LL and the supplied coefficient lines thereof, thereby generating two image lines in the baseband.

The reading control unit 223 and the inverse wavelet transform control unit 224 perform these controls at such timings that the inverse wavelet transform unit 105 performs one synthesis filtering to generate the two image lines in the baseband during the fifteenth horizontal synchronization period.

The image line output unit 106 outputs the two generated lines during the fifteenth horizontal synchronization period and the sixteenth horizontal synchronization period.

As described above, the reading control unit 223 and the inverse wavelet transform control unit 224 performs the controls based on the characteristics of the video formats, and thereby it is possible to output the image data in the baseband by two lines every other horizontal synchronization period. Therefore, the image line output unit 106 can output the image data in the baseband by one line every horizontal synchronization period. In other words, as long as any video formats are realizable, decoded image data can be used instantly (in a real-time) such as in the image display.

In this way, the decoding device 100 can realize the decoding process in a lower delay manner without following the video formats.

The image line output unit 106 embeds the buffer therein, and outputs the image lines supplied by two lines from the inverse wavelet transform unit 105 by one line using the buffer. If a capacity of the buffer is increased and image lines of three lines or more can be accumulated, it is possible to cope with the delay in the inverse wavelet transform process, but there is a problem in that a manufacturing cost is increased caused by the increase in the memory capacity or a delay time is increased.

With respect to this, the decoding device 100 performs the controls as described above, and thereby suppresses the increase in the memory capacity and realizes the decoding process in a lower delay manner.

As can be seen from the table in FIG. 14, the length of the horizontal blank interval depends on a resolution or a frame rate of an image. That is to say, the length of the horizontal blank interval is set for each video format, and the length of the horizontal blank interval may be different between pieces of image data having different video formats.

For example, in a case of an image of 1920×1080@60i, the H blank value is 280 samples, and in a case of an image of 1280×720@240, the H blank value is 2845 samples.

The length of the horizontal blank interval indicates a marginal degree in the decoding process. That is, a longer horizontal blank interval indicates that the number of samples to be processed during the horizontal synchronization period is small (valid horizontal size is small) with respect to the length of the horizontal synchronization period (horizontal size). That is, the marginal degree in the decoding process (H blank value) is increased. In contrast, a shorter horizontal blank interval indicates that the number of samples to be processed during the horizontal synchronization period is large (valid horizontal size is large) with respect to the length of the horizontal synchronization period (horizontal size). That is, the marginal degree in the decoding process (H blank value) is decreased.

As the marginal degree is increased, a freedom degree in timings of performing the synthesis filtering is also increased. For example, generally, when a process having a length of 1 is performed ten times during a period having a length of 10, there is little margin and it is necessary for each process to be performed, but when it is good for a process having a length of 2 to be performed twice during the period having a length of 10, the process can be started at more varied timings.

In a range of this freedom degree, it is advantageous to fundamentally start a process temporally later since a time for accumulating coefficient data in the buffer unit 104 is secured. In other words, even when the length of the horizontal synchronization period is the same, an optimal reading start timing of the coefficient data from the buffer unit 104 is different depending on the length of the horizontal blank interval.

Therefore, the format determination unit 221 supplies the resultant determination of the characteristics of the video formats to the reading start timing control unit 222 (the arrow 252 in FIG. 13).

The reading start timing control unit 222 adjusts a reading start timing of the coefficient data based on a length of the horizontal blank interval shown by the resultant determination, and notifies the reading control unit 223 of the adjusted reading start timing (the arrow 253).

For example, if the horizontal blank interval is long, the reading start timing control unit 222 sets a reading start timing of the coefficient data temporally as late as possible. In contrast, if the horizontal blank interval is short, the reading start timing control unit 222 sets a reading start timing of the coefficient data temporally as early as possible.

The reading control unit 223 controls the reading unit 214 to begin reading the coefficient data at the reading start timing.

In this way, the reading control unit 223 can make the coefficient data read at a more appropriate timing depending on the length of the horizontal blank interval.

The reading start timing control unit 222 may control the reading unit 214 not using the reading control unit 223. In this case, however, it is necessary for the reading control unit 223 as well to grasp that the reading start timing control unit 222 makes the coefficient data read, for a subsequent reading control.

An amount of the coefficient data read by the reading unit 214 varies every horizontal synchronization period due to the control of the reading control unit 223 as described above. For this reason, it is thought that there is a case where an overflow or an underflow is generated in the buffer unit 104 depending on video formats.

Thereby, the buffer control unit 225 manages a data amount (buffer amount) accumulated in the buffer unit 104 based on a counted value (amount of input data) supplied from the input data amount counting unit 212 and a counted value (amount of input data) supplied from the output data amount counting unit 213, and controls reading of the coefficient data from the buffer unit 104 such that the overflow or the underflow is generated in the buffer unit 104.

That is to say, the buffer control unit 225 calculates a buffer amount based on the amount of input data and the amount of output data, and when the overflow seems to be generated, controls the reading control unit 223 (the arrow 258) such that the reading unit 214 promptly reads the coefficient data even if not an original reading timing.

On the other hand, when the underflow seems to be generated in the buffer unit 104, the buffer control unit 225 controls the reading control unit 223 (the arrow 258) such that the reading unit 214 does not read the coefficient data even at an original timing.

As shown in FIG. 13, the buffer control unit 225 has a buffer amount calculation unit 231, a buffer amount determination unit 232, and a reading adjustment unit 233.

The buffer amount operation unit 231 calculates a buffer amount indicating a data amount of the coefficient data accumulated in the buffer unit 104 based on the counted value of the amount of input data or the amount of output data.

The buffer amount determination unit 232 determines whether or not the buffer amount calculated by the buffer amount calculation unit 231 is smaller or larger than a predetermined threshold value (allowable value) set in advance. The threshold value (allowable value) includes a threshold value for suppressing the generation of the overflow, that is, an allowable value indicating an upper limit in an allowable range of the buffer amount, and a threshold value for suppressing the generation of the underflow, that is, an allowable value indicating a lower limit in the allowable range of the buffer amount.

The reading adjustment unit 233 makes the coefficient data read from the buffer unit 104 for the adjustment of the buffer amount based on the resultant determination.

For example, if the buffer amount is larger than the allowable value indicating the upper limit in the allowable range, since there is concern about the generation of the overflow, the reading adjustment unit 233 controls the reading control unit 223 such that the reading unit 214 promptly reads the coefficient data.

Also, for example, if the buffer amount is smaller than the allowable value indicating the lower limit in the allowable range, since there is concern about the generation of the underflow, the reading adjustment unit 233 controls the reading control unit 223 such that the reading unit 214 does not read the coefficient data.

In this way, the buffer control unit 225 controls the reading of the coefficient data from the buffer unit 104 and thereby controls the buffer amount in the buffer unit 104. Therefore, it is possible to suppress the generation of the overflow or the underflow in the buffer unit 104. Thereby, the decoding device 100 can realize the decoding process in a lower delay manner.

The reading adjustment unit 233 may controls the reading unit 214 not using the reading control unit 223. In this case, however, it is necessary for the reading control unit 223 as well to grasp that the reading adjustment unit 233 makes the coefficient data read, for a subsequent reading control.

The buffer control unit 225 may suppress either the generation of the overflow or the generation of the underflow. In this case, the buffer control unit 225 facilitates controls to thereby reduce processing burden, but does not suppress generation of the other.

Meanwhile, easy generation of the overflow or the underflow depends on the characteristics of the video formats.

For example, when the horizontal blank interval is short, the underflow tends to be generated since a marginal degree is small and an amount of the coefficient data read from the buffer unit 104 per unit time is large. On the contrary, when the horizontal blank interval is long, the overflow tends to be generated since a marginal degree is large and an amount of the coefficient data read from the buffer unit 104 per unit time is small.

For this reason, the buffer control unit 225 performs a control process only for a side having a higher possibility of the generation of the overflow and the underflow. In this way, the buffer control unit 225 can omit a process for a side having a lower possibility of the generation and thus reduce processing burdens accordingly.

Also, easy generation of the overflow and the underflow depends on characteristics of video formats. Therefore, the buffer control unit 225 determines which side of the overflow and the underflow has a higher possibility of generation, based on the characteristics.

The format determination unit 221 notifies the buffer control unit 225 as well of the resultant determination of the formats (the arrow 257). The buffer control unit 225 determines if the overflow is easily generated or the underflow is easily generated based on a length of the horizontal blank interval shown by the resultant determination, and performs a process only for a side easily generated.

In this way, the buffer control unit 225 can perform a process for suppressing the generation of the overflow or the underflow according to the characteristic of the video format (the length of the horizontal blank interval) and can perform processes more efficiently.

Flow of Process

An example of a flow of the decoding process performed by the decoding device 100 described above will be described with reference to the flowchart in FIG. 16.

If the decoding process starts, at step S101, the entropy decoding unit 101 of the decoding device 100 performs entropy decoding for supplied encoded data.

At step S102, the inverse quantization unit 102 inversely quantizes the coefficient data obtained by performing the entropy decoding for the encoded data by the process at step S101.

At step S103, the inverse quantization unit 102 writes the coefficient data inversely quantized by the process at step S102, in the buffer unit 104.

At step S104, the control unit 103 controls the inverse quantization unit 102 to read the coefficient data from the buffer unit 104. The inverse wavelet transform unit 105 performs the inverse wavelet transform for the read coefficient data under the control of the control unit 103.

At step S105, the image line output unit 106 outputs the image lines obtained by the inverse wavelet transform by one line in synchronization with the horizontal synchronization signal.

If the process at step S105 is completed, the decoding process is finished.

The above-described processes are repeated for each predetermined data unit. The above-described processes at the respective steps may be performed together.

Next, an example of a flow of a reading control process performed at step S104 in FIG. 16 will be described with reference to the flowchart in FIG. 17.

If the reading control process starts, at step S121, the format determination unit 221 determines characteristics of a video format of the coefficient data which is written in buffer unit 104 by the writing unit 211.

At step S122, the reading start timing control unit 222 sets a reading start timing according to a length of the horizontal blank interval.

At step S123, the reading control unit 223 controls the reading unit 214 to read the coefficient data from the buffer unit 104 at such a pace that image data can be output by one line during the horizontal synchronization period. Of course, the reading control unit 223 performs the reading according to the reading start timing set at step S122.

At step S124, the inverse wavelet transform control unit 224 controls the inverse wavelet transform unit 105 to perform the inverse wavelet transform at such a pace that the image data can be output by one line during the horizontal synchronization period.

Figure 16:
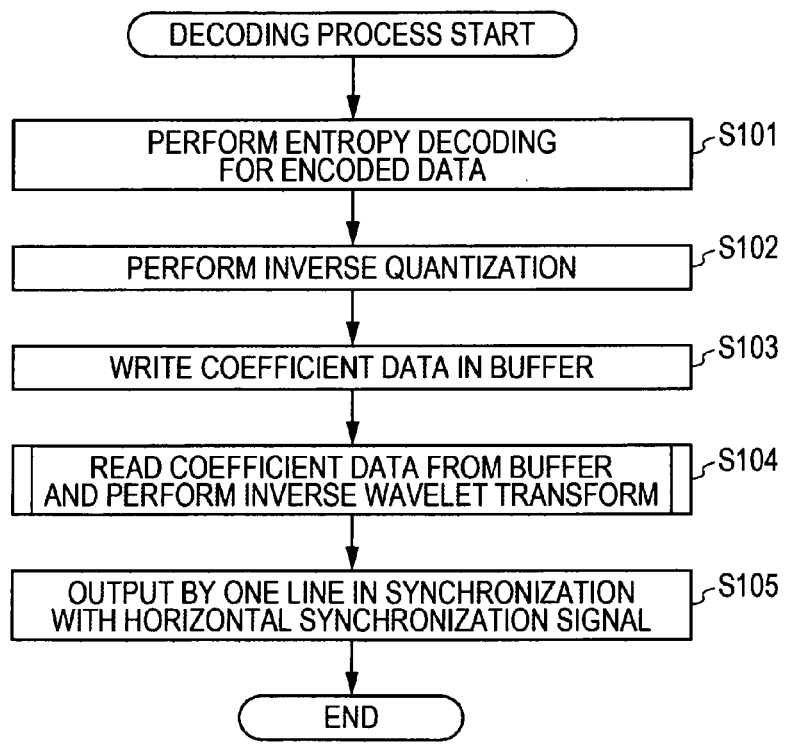
FIG. 16 is a flowchart illustrating an example of a decoding process flow.
Figure 17:
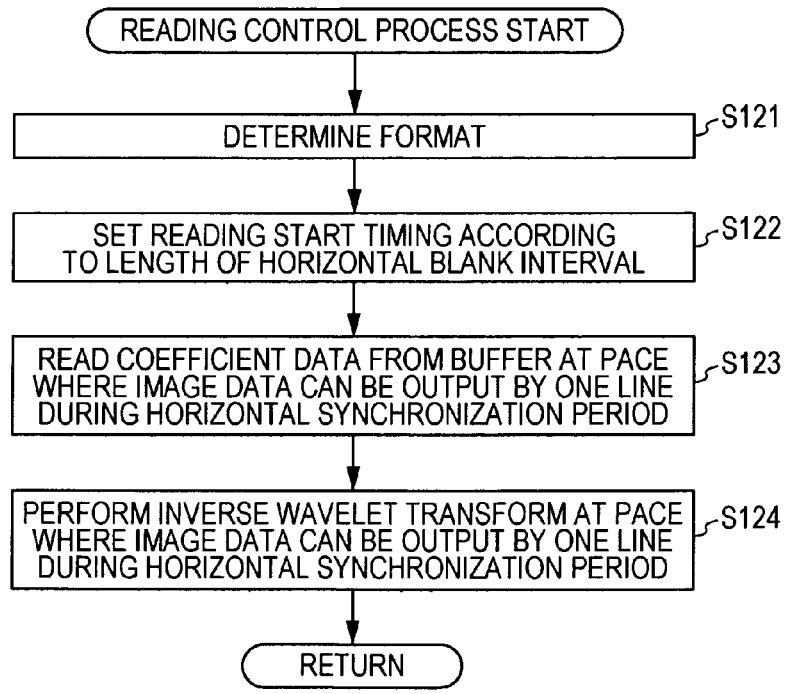
FIG. 17 is a flowchart illustrating an example of a reading control process.

If the process at step S124 is completed, the reading control process is finished, and then the flow returns to the process at step S104 in FIG. 16, and the processes are performed from step S105.

The control unit 103 performs the above-described reading control process, and thereby the decoding device 100 can realize a lower delay decoding process without following the video format.

The reading control unit 223 and the inverse wavelet transform control unit 224 may perform the reading control process in accordance with a predetermined length of the horizontal synchronization period set in advance. In this case, the processes at steps S121 and S122 in FIG. 17 may be omitted. Also, in FIG. 13, the format determination unit 221, the reading start timing control unit 222, and the buffer control unit 225 of the control unit 103 may be omitted.

The reading control unit 223 and the inverse wavelet transform control unit 224 may perform the reading control process according to the characteristic of the video format (the length of the horizontal synchronization period) determined by the format determination unit 221. In this case, the process at step S122 in FIG. 17 may be omitted. Also, the reading start timing control unit 222 and the buffer control unit 225 of the control unit 103 may be omitted.

Further, the control unit 103 may perform only the reading control process. In this case, the buffer control unit 225 of the control unit 103 in FIG. 13 may be omitted.

The decoding device 100 performs a buffer control process for controlling a buffer amount in the buffer unit 104 along with the decoding process shown in FIG. 16.

An example of a flow of the buffer control process will be described with reference to the flowcharts in FIGS. 18 and 19.

If the buffer control process starts, at step S141, the format determination unit 221 determines the characteristic of the video format (the length of the horizontal blank interval) of the coefficient data written in the buffer unit 104 by the writing unit 211. For example, the format determination unit 221 compares the length of the horizontal blank interval with a predetermined time (threshold value) and determines whether or not to be longer than the threshold value.

When it is determined that the horizontal blank interval is longer than the predetermined time, the control unit 103 enables the process at the step S143 to be performed, at step S142. In the case where the horizontal blank interval is long, since the possibility of the generation of the overflow is high, a process for suppressing the generation of the overflow is performed from step S143.

At step S143, the input data amount counting unit 212 counts a data amount (In_Data) of the coefficient data written in the buffer unit 104.

At step S144, the buffer amount calculation unit 231 calculates the buffer amount (Buffer) by reflecting the input data amount as shown in an equation (7).

$$Buffer = Buffer + In\_Data \quad (7)$$

At step S145, the reading control unit 223 determines whether or not to come to a reading scheduled timing, and when it is determined not to come to the reading scheduled timing, the flow goes to a process at step S146.

At step S146, the buffer amount determination unit 232 compares the buffer amount with a predetermined allowable value (threshold value) set in advance, and determines whether or not the buffer amount exceeds the allowable value. When it is determined that the buffer amount is equal to or less than the allowable value, the buffer amount determination unit 232 enables a process at step S147 to be performed.

At step S147, particularly, the reading adjustment unit 233 does not control the reading control unit 223 but waits. Further, the flow returns to step S143, where the reading adjustment unit 233 performs the process.

When it is determined that the buffer amount exceeds the allowable value at step S146, the buffer amount determination unit 232 enables a process at step S148 to be performed.

At step S148, in order to suppress the generation of the overflow, the reading adjustment unit 233 controls the reading control unit 223 such that the reading unit 214 promptly reads the coefficient data. If this process is completed, the reading adjustment unit 233 enables a process at step S149 to be performed.

When it is determined to come to the reading scheduled timing at step S145, the reading control unit 223 enables the process at step S149 to be performed. In this case, the reading control unit 223 is not controlled by the reading adjustment unit 233 and thus the reading unit 214 read the coefficient data on schedule.

At step S149, the output data amount counting unit 213 counts a data amount (Out_Data) of the coefficient data read from the buffer unit 104.

At step S150, the buffer amount calculation unit 231 calculates a buffer amount (Buffer) as shown in an equation (8) by reflecting the output data amount.

$$Buffer = Buffer - Out\_Data \quad (8)$$

At step S151, the control unit 103 determines whether or not to finish the buffer control process. When unprocessed coefficient data is present and it is determined to continue the buffer control process, the flow goes to step S143, and the control unit 103 performs the processes therefrom. That is to say, the processes from step S143 to step S151 are repeated until all of the coefficient data is processed.

At step S151, when it is determined to finish the buffer control process, the control unit 103 finishes the buffer control process.

Figure 19:
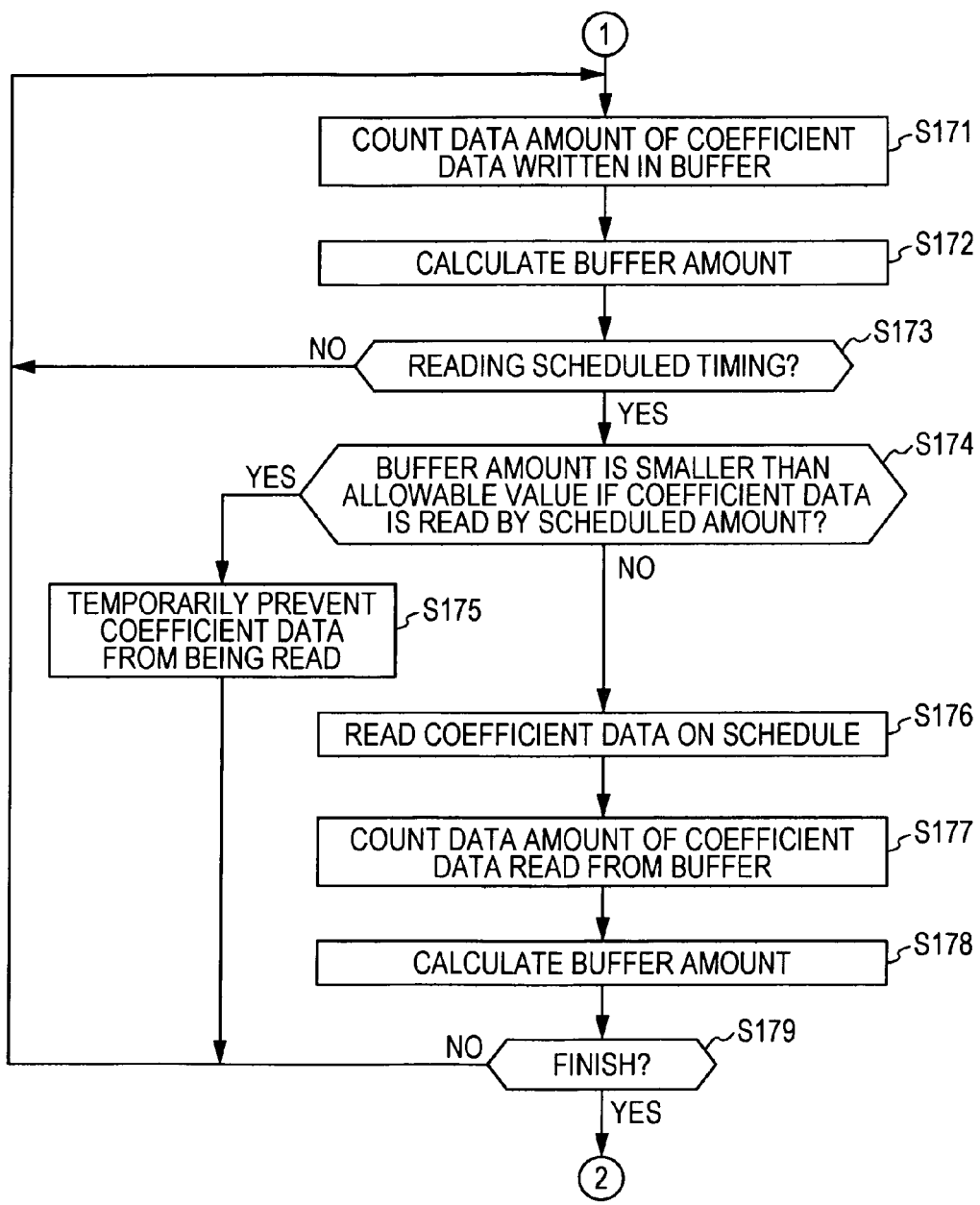
FIG. 19 is a flowchart illustrating an example of a buffer control process flow, which is subsequent to FIG. 18.

When it is determined that the horizontal blank interval is shorter than the predetermined time by the determination at step S141, the control unit 103 controls a process at step S171 in FIG. 19 to be performed, at step S142. When the horizontal blank interval is short, since the possibility of the generation of the underflow is high, processes for suppressing the generation of the underflow are performed from step S171.

At step S171, the input data amount counting unit 212 counts the data amount (In_Data) of the coefficient data written in the buffer unit 104.

At step S172, the buffer amount calculation unit 231 calculates the buffer amount (Buffer) by reflecting the input data amount as shown in the above-described equation (7).

At step S173, the reading control unit 223 determines whether or not to come to a reading scheduled timing. When it is determined not to come to the reading scheduled timing, the flow returns to a process at step S171, and the reading control unit 223 performs the processes therefrom. In other words, in the case of processing the underflow, the reading adjustment unit 233 performs controls only at a typical reading scheduled timing where the reading control unit 223 controls the reading unit 214 to read the coefficient data in the absence of the control of the reading adjustment unit 233.

At step S173, when it is determined to come to a reading scheduled timing, the reading control unit 223 enables a process at step S174 to be performed.

At step S174, the buffer amount determination unit 232 compares a buffer amount when the coefficient data is read by a scheduled amount with a predetermined allowable value (threshold value) set in advance, and determines whether or not the buffer amount is smaller than the allowable value if the coefficient data is read by the scheduled amount. When it is determined that the buffer amount is smaller than the allowable value, the buffer amount determination unit 232 enables a process at step S175 to be performed.

In this case, since the possibility of the generation of the underflow is high, at step S175, in order to suppress the generation of the underflow, the reading adjustment unit 233 controls the reading control unit 223 to be temporarily prevented from reading the coefficient data. In other words, the reading control unit 223 is prevented from reading the coefficient data at this reading scheduled timing.

After the prevention of the reading, the flow returns to step S171, and the reading adjustment unit 233 performs processes therefrom.

At step S174, when it is determined that the buffer amount is equal to or more than the allowable value even after the coefficient data is read by the scheduled amount, the buffer amount determination unit 232 enables a process at step S176 to be performed.

At step S171, the reading adjustment unit 233 does not control the reading control unit 223. In other words, the reading control unit 223 allows the reading unit 214 to read the coefficient data on schedule. If this process is completed, the reading control unit 223 enables a process at step S177 to be performed.

At step S177, the output data amount counting unit 213 counts the data amount (Out_Data) of the coefficient data read from the buffer unit 104.

At step S178, the buffer amount calculation unit 231 calculates a buffer amount (Buffer) as shown in the above-described equation (8) by reflecting the output data amount.

At step S179, the control unit 103 determines whether or not to finish the buffer control process. When unprocessed coefficient data exists and it is determined to continue the buffer control process, the flow returns to step S171, and the control unit 103 performs the processes therefrom. That is to say, the processes from step S171 to step S179 are repeated until all of the coefficient data is processed.

Figure 18:
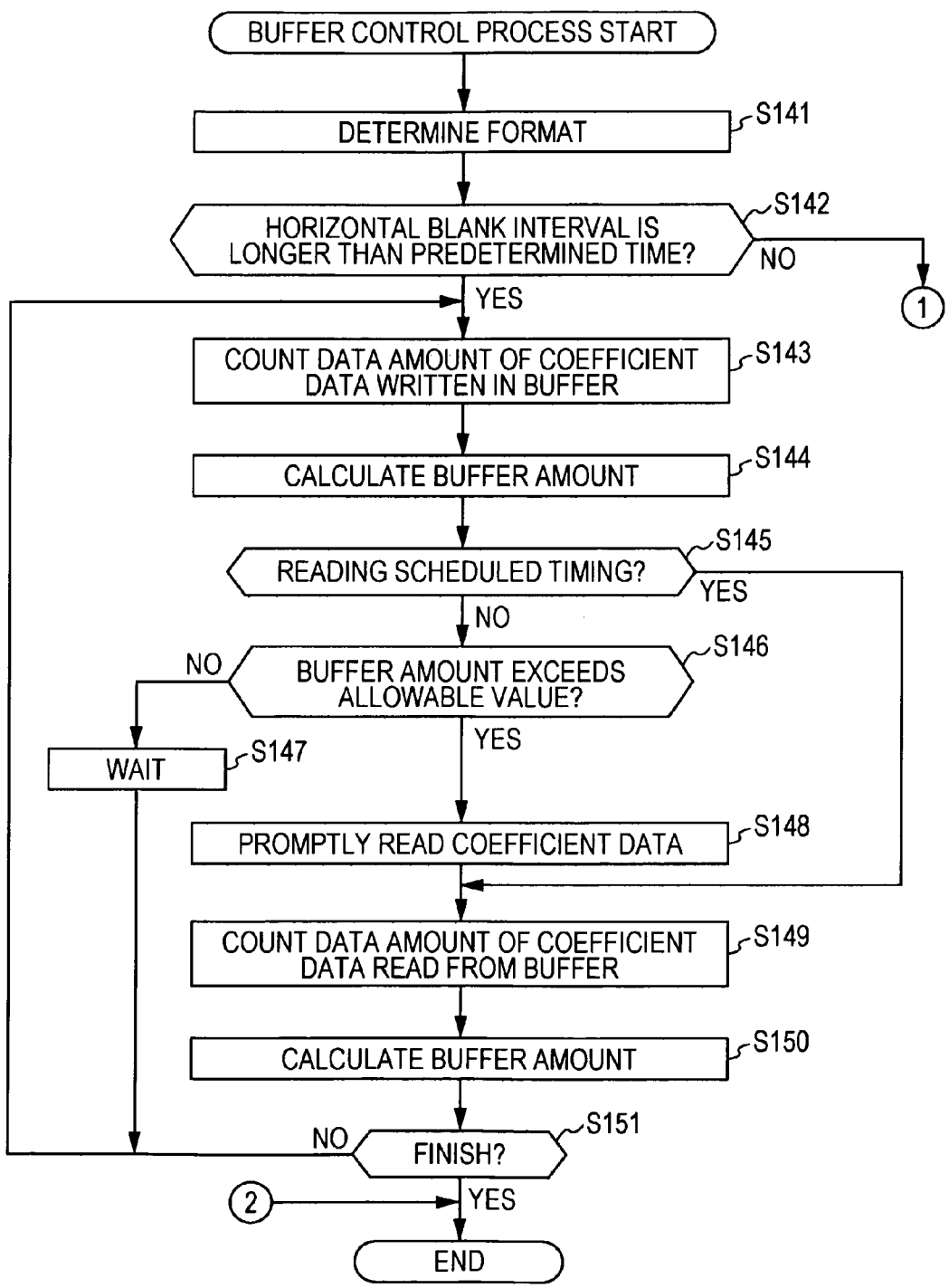
FIG. 18 is a flowchart illustrating an example of a buffer control process flow.

At step S179, when it is determined to finish the buffer control process, the control unit 103 returns to the processes in FIG. 18 and finishes the buffer control process.

By performing the buffer control process as described above, the decoding device 100 can suppress the generation of the overflow or the underflow.

The buffer control unit 225 may suppress only the generation of the overflow. In this case, the respective processes at steps S141 and S142 in FIG. 18 and steps S171 to S179 in FIG. 19 may be omitted.

Also, the buffer control unit 225 may suppress only the generation of the underflow. In this case, the respective processes at steps S141 to S151 in FIG. 18 are omitted, and only the processes in FIG. 19 are performed.

2. Second Embodiment

Personal Computer

The above-described series of processes may be performed by hardware or software. In this case, for example, as shown in FIG. 20, there may be a configuration of a personal computer.

Figure 20:
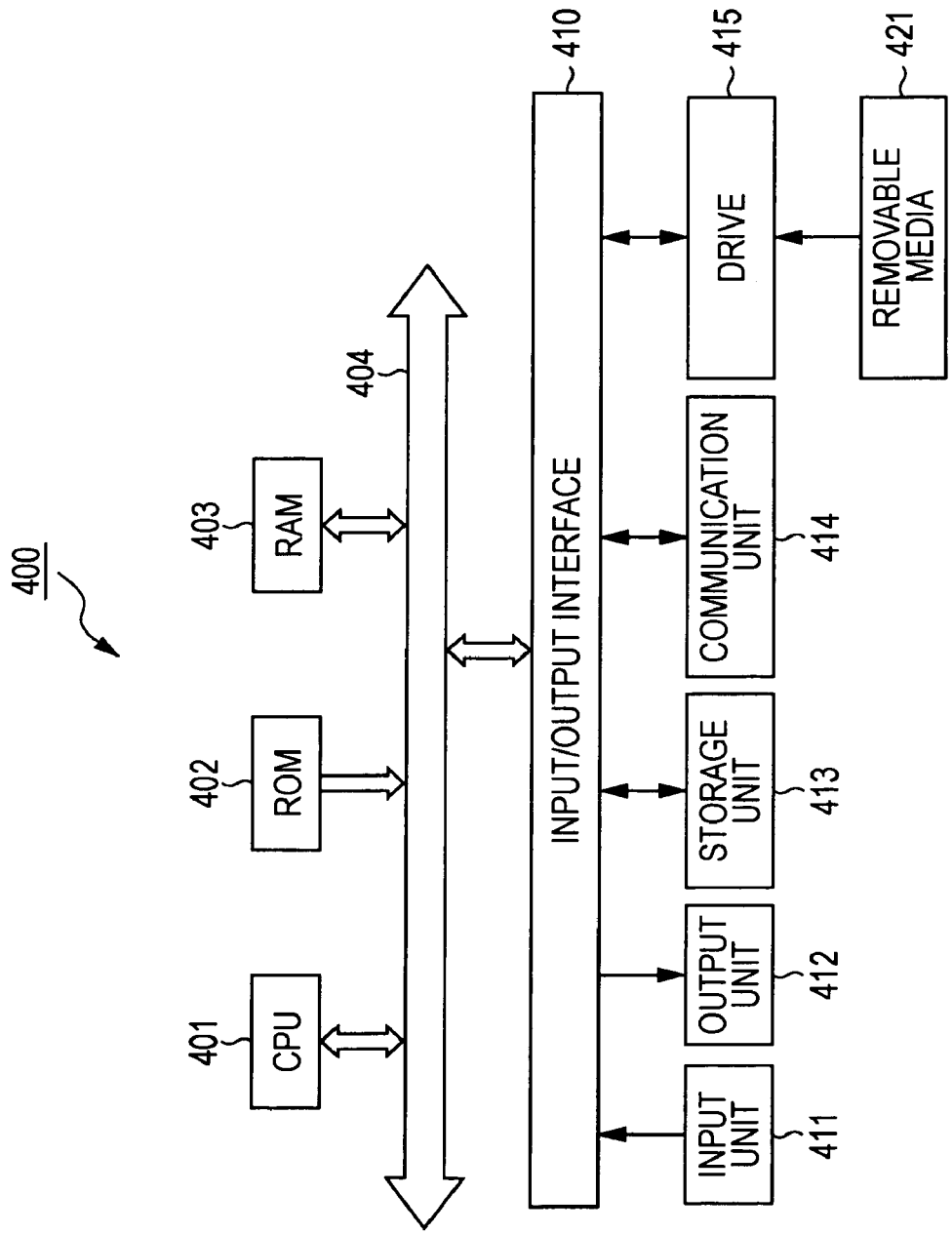
FIG. 20 is a block diagram illustrating a configuration example of a personal computer according to an embodiment of the present invention.

In FIG. 20, a CPU (central processing unit) 401 of a personal computer 400 performs various kinds of processes according to programs stored in a ROM (read only memory) 402 or programs loaded to a RAM (random access memory) 403 from a storage unit 413. The RAM 403 appropriately stores data or the like necessary for the CPU 401 to perform the various kinds of processes.

The CPU 401, the ROM 402, and the RAM 403 are connected to each other via a bus 404. The bus 404 is also connected to an input and output interface 410.

The input and output interface 410 is connected to an input unit 411 constituted by a keyboard, a mouse, or the like, to an output unit 412 constituted by a display such as a CRT (cathode ray tube) display or an LCD (liquid crystal display), and a speaker, to the storage unit 413 constituted by an SSD (solid state drive) such as a flash memory, or a hard disk, or the like, and to a communication unit 414 constituted by an interface or a modem of a wired LAN (local area network) or a wireless LAN or the like. The communication unit 414 performs communication via a network including the Internet.

The input and output interface 410 is optionally connected to a drive 415. A magnetic disk, an optical disc, a magnetic optical disk, or a removable medium 421 such as a semiconductor memory is appropriately equipped in the drive 415, and computer programs read therefrom are optionally installed in the storage unit 413.

In a case where the above-described series of processes is performed by software, programs constituting the software are installed from a network or recording media.

The recording media include magnetic disks (including a flexible disk), optical discs (including a CD-ROM (compact disc-read only memory) and DVD (digital versatile disc)), magnetic optical disks (including an MD (mini disc)), or the removable medium 421 such as a semiconductor memory, which store programs and are distributed, for example, as shown in FIG. 20, separately from the device main body, in order to deliver the programs to a user, and further includes the ROM 402 or a hard disk included in the storage unit 413, which stores programs delivered to a user, in a state of being embedded in the main body.

The programs executed by the computer may be programs where processes are performed in a time series according to the order described in this specification, or may be programs executed in parallel therewith or programs where processes are performed at a necessary timing such as when accessed.

Also, in this specification, the steps for describing programs recorded in a recording medium include not only processes performed in a time series according to the described order, but also processes performed in parallel or separately even if not necessarily performed in the time series.

In this specification, the system indicates the entire device configured by a plurality of devices.

In the above description, a configuration described using one device (or processing unit) may be constituted by a plurality of devices (or processing units). On the contrary, configurations described using a plurality of devices (or processing units) may be integrally constituted by one device (or processing unit). Also, configurations other than the configurations described above may be added to the configuration of each device (or processing unit). Also, if a configuration or an operation as an entire system is substantially the same, a portion of a configuration of a certain device (or processing unit) may be included in a configuration of another device (or another processing unit). That is to say, the embodiments of the present invention are not limited to the above-described embodiments but may have various modifications without departing from the scope of the present invention.

The present invention is suitable for a device which can be used for a system or the like, for example, which compresses moving image signals, video signals, or still images, transmits and receives, and decompresses them so as to output images. Specifically, the present invention is applicable to mobile communication devices, teleconference systems, monitoring camera and recorder systems, tele-medical diagnosis, video compression and transmission in a broadcasting station, delivery of live broadcasting images, interactive communication between teachers and students, transmission of still images and moving images in a wireless manner, interactive game applications, and the like.

It should be understood by those skilled in the art that various modifications, combinations, sub-combinations and alterations may occur depending on design requirements and other factors insofar as they are within the scope of the appended claims or the equivalents thereof.

What is claimed is:

1. An image processing device comprising:
    a supply means that supplies a coefficient data group in each sub-band, in which image data of a predetermined number of lines is decomposed for each frequency band by a hierarchical analysis filter process and which includes coefficient data of one line or more in a sub-band of at least a lowest frequency component;
    a synthesis filter means that synthesizes the coefficient data group supplied by the supply means in a predetermined order and generates image data in a baseband;
    a supply control means that controls the supply means to supply the coefficient data at such a timing that the synthesis filter means can generate the image data in the baseband at a timing corresponding to a horizontal synchronization period indicating a period between horizontal synchronization signals of the image data; and
    a synthesis filtering control means that controls the synthesis filter means to synthesize the coefficient data group supplied by the supply means in the predetermined order and generate the image data in the baseband at a timing corresponding to the horizontal synchronization period.

2. The image processing device according to claim 1, wherein the synthesis filter means synthesizes the coefficient data group in an order for more preferentially generating a higher frequency component, and
    wherein the supply control means controls the supply means to supply the coefficient data necessary for the synthesis at such a timing that the synthesis filter means can synthesize in the order and generate the image data in the baseband by two lines every other horizontal synchronization period.

3. The image processing device according to claim 1 further comprising a determination means that determines a length of the horizontal synchronization period of the image data,
    wherein the supply control means controls the supply means to supply the coefficient data at such a timing that the synthesis filter means can generate the image data in the baseband at a timing corresponding to the horizontal synchronization period determined by the determination means, and
    wherein the synthesis filtering control means controls the synthesis filter means to generate the image data in the baseband at a timing corresponding to the horizontal synchronization period determined by the determination means.

4. The image processing device according to claim 3, wherein the determination means determines a length of a horizontal blank interval of the image data, and
    wherein the image processing device further includes a supply start timing control means that controls a timing when the supply means starts supplying the coefficient data to the synthesis filter means according to the length of the horizontal blank interval determined by the determination means.

5. The image processing device according to claim 1, further comprising a storage means that stores the coefficient data group supplied to the synthesis filter means,
    wherein the supply means reads the coefficient data stored in the storage means and supplies the read coefficient data to the synthesis filter means, and
    wherein the supply control means controls the supply means to read the coefficient data from the storage means.

6. The image processing device according to claim 5, further comprising:
    a calculation means that calculates a data amount of the coefficient data stored in the storage means;
    a determination means that determines whether or not the data amount calculated by the calculation means exceeds a predetermined threshold value set in advance; and
    an adjustment means that makes the supply means promptly read the coefficient data stored in the storage means when the determination means determines that the data amount exceeds the threshold value.

7. The image processing device according to claim 5, further comprising:
    a calculation means that calculates a data amount of the coefficient data stored in the storage means;
    a determination means that determines whether or not the data amount calculated by the calculation means is smaller than a predetermined threshold value set in advance; and
    an adjustment means that prevents the supply means from reading the coefficient data stored in the storage means when the determination means determines that the data amount is smaller than the threshold value.

8. The image processing device according to claim 5, further comprising:
    a horizontal blank interval determination means that determines a length of a horizontal blank interval of the image data;
    a calculation means that calculates a data amount of the coefficient data stored in the storage means;
    a data amount determination means that determines whether or not the data amount calculated by the calculation means exceeds a predetermined first threshold value set in advance when the horizontal blank interval determination means determines that the horizontal blank interval is long, and that determines whether or not the data amount calculated by the calculation means exceeds a predetermined second threshold value set in advance which is smaller than the first threshold value, when the horizontal blank interval determination means determines that the horizontal blank interval is short;
    an adjustment means that makes the supply means promptly read the coefficient data stored in the storage means when the data amount determination means determines that the data amount exceeds the first threshold value, and that prevents the supply means from reading the coefficient data stored in the storage means when the data amount determination means determines that the data amount is smaller than the second threshold value.

9. An image processing method in an image processing device, comprising the steps of:
    causing a supply means of the image processing device to supply a coefficient data group in each sub-band, in which image data of a predetermined number of lines is decomposed for each frequency band by a hierarchical analysis filter process and which includes coefficient data of one line or more in a sub-band of at least a lowest frequency component;
    causing a synthesis filter means of the image processing device to synthesize the coefficient data group supplied by the supply means in a predetermined order and generate image data in a baseband;
    causing a supply control means of the image processing device to control the supply means to supply the coefficient data at such a timing that the synthesis filter means can generate the image data in the baseband at a timing corresponding to a horizontal synchronization period indicating a period between horizontal synchronization signals of the image data; and causing a synthesis filtering control means of the image processing device to control the synthesis filter means to synthesize the coefficient data group supplied by the supply means in the predetermined order and generate the image data in the baseband at a timing corresponding to the horizontal synchronization period.

10. An image processing device comprising:

a supply unit that supplies a coefficient data group in each sub-band, in which image data of a predetermined number of lines is decomposed for each frequency band by a hierarchical analysis filter process and which includes coefficient data of one line or more in a sub-band of at least a lowest frequency component;

a synthesis filter unit that synthesizes the coefficient data group supplied by the supply unit in a predetermined order and generates image data in a baseband;

a supply control unit that controls the supply unit to supply the coefficient data at such a timing that the synthesis filter unit can generate the image data in the baseband at a timing corresponding to a horizontal synchronization period indicating a period between horizontal synchronization signals of the image data; and a synthesis filtering control unit that controls the synthesis filter unit to synthesize the coefficient data group supplied by the supply unit in the predetermined order and generate the image data in the baseband at a timing corresponding to the horizontal synchronization period.

* * * * *